(12) United States Patent
King

(10) Patent No.: US 8,687,650 B2
(45) Date of Patent: Apr. 1, 2014

(54) SYSTEM, METHOD, AND COMPUTER PROGRAM PRODUCT FOR CONNECTING OR COUPLING ANALOG AUDIO TONE BASED COMMUNICATIONS SYSTEMS OVER A PACKET DATA NETWORK

(75) Inventor: Graham King, Clifton, VA (US)

(73) Assignee: NSGDatacom, Inc., Chantilly, VA (US)

( * ) Notice: Subject to any disclaimer, the term of this patent is extended or adjusted under 35 U.S.C. 154(b) by 0 days.

(21) Appl. No.: 13/329,144

(22) Filed: Dec. 16, 2011

(65) Prior Publication Data
US 2012/0106543 A1    May 3, 2012

Related U.S. Application Data

(63) Continuation-in-part of application No. 11/952,818, filed on Dec. 7, 2007, now Pat. No. 8,094,679.

(51) Int. Cl.
*H04J 3/16* (2006.01)

(52) U.S. Cl.
USPC ............................................ 370/466; 370/494

(58) Field of Classification Search
USPC ................... 370/252, 352, 391, 401, 466, 494
See application file for complete search history.

(56) References Cited

U.S. PATENT DOCUMENTS

| | | | |
|---|---|---|---|
| 4,295,008 A | 10/1981 | Johnson et al. |
| 4,303,804 A | 12/1981 | Johnson et al. |
| 4,305,149 A | 12/1981 | Harrison |
| 4,365,112 A | 12/1982 | O'Neill et al. |
| 4,446,454 A | 5/1984 | Pyle |
| 4,475,190 A | 10/1984 | Marouf et al. |
| 4,581,606 A | 4/1986 | Mallory |
| 4,777,474 A | 10/1988 | Clayton |
| 4,782,485 A | 11/1988 | Gollub |
| 4,796,293 A | 1/1989 | Blinken et al. |
| 4,862,452 A | 8/1989 | Milton et al. |
| 4,942,570 A | 7/1990 | Kotzin et al. |
| 5,018,136 A | 5/1991 | Gollub |

(Continued)

FOREIGN PATENT DOCUMENTS

FR    2898233 A1 *  9/2007

OTHER PUBLICATIONS

"Verizon Business Software Alliance—NSGDatacom—Move your fixed-line communications to wireless IP." Internal Marketing Communication, Verizon Wireless, 2011.

(Continued)

*Primary Examiner* — Ricky Ngo
*Assistant Examiner* — Michael Phillips
(74) *Attorney, Agent, or Firm* — ATFirm PLLC; Ralph P. Albrecht

(57) ABSTRACT

An automated telecommunications system includes a first system operable to receive PSTN compatible audio frequency signals, to decode and interpret said incoming signals according to the message format and a modem protocol being used, and transmit digital messages to a second system over a packet data network. Said second system receives and interprets digital messages incoming from the first system, encodes and regenerate outgoing audio frequency signals. The system may be bi-directional and operate over a packet based data network, such as for example an Internet protocol (IP) based network, a satellite based network, or an IP based cable or wireless network. The functionality of said first and second systems may be combined at a single location and operate with a VoIP network to allow modem signals to pass across the VoIP system.

33 Claims, 10 Drawing Sheets

(56) References Cited

U.S. PATENT DOCUMENTS

| | | | |
|---|---|---|---|
| 5,020,098 A | 5/1991 | Celli | |
| 5,027,104 A | 6/1991 | Reid | |
| 5,062,147 A | 10/1991 | Pickett et al. | |
| 5,195,126 A | 3/1993 | Carrier et al. | |
| 5,221,250 A | 6/1993 | Cheng | |
| 5,276,678 A | 1/1994 | Hendrickson et al. | |
| 5,438,607 A | 8/1995 | Przygoda, Jr. et al. | |
| 5,444,707 A | 8/1995 | Cerna et al. | |
| 5,481,589 A | 1/1996 | Morduch | |
| 5,495,522 A | 2/1996 | Allen et al. | |
| 5,619,564 A | 4/1997 | Canniff et al. | |
| 5,636,292 A | 6/1997 | Rhoads et al. | |
| 5,812,819 A | 9/1998 | Rodwin et al. | |
| 5,838,665 A | 11/1998 | Kahn et al. | |
| 5,862,260 A | 1/1999 | Rhoads et al. | |
| 5,898,673 A | 4/1999 | Riggan et al. | |
| 5,907,547 A | 5/1999 | Foladare et al. | |
| 5,943,343 A | 8/1999 | Hatta et al. | |
| 5,974,043 A | 10/1999 | Solomon et al. | |
| 6,014,441 A | 1/2000 | Mark | |
| 6,028,860 A | 2/2000 | Laubach et al. | |
| 6,035,016 A | 3/2000 | Moore | |
| 6,069,890 A | 5/2000 | White et al. | |
| 6,078,665 A | 6/2000 | Anderson et al. | |
| 6,097,804 A | 8/2000 | Gilbert et al. | |
| 6,131,121 A | 10/2000 | Mattaway et al. | |
| 6,137,793 A | 10/2000 | Gorman et al. | |
| 6,144,670 A | 11/2000 | Sponaugle et al. | |
| 6,192,123 B1 | 2/2001 | Grunsted et al. | |
| 6,295,346 B1 | 9/2001 | Markowitz et al. | |
| 6,335,927 B1 | 1/2002 | Elliott et al. | |
| 6,369,705 B1 | 4/2002 | Kennedy | |
| 6,370,555 B1 | 4/2002 | Bartkowiak | |
| 6,377,589 B1 | 4/2002 | Knight et al. | |
| 6,400,265 B1 | 6/2002 | Saylor et al. | |
| 6,532,088 B1 | 3/2003 | Dantu et al. | |
| 6,542,739 B1 | 4/2003 | Garner | |
| 6,614,781 B1 | 9/2003 | Elliott et al. | |
| 6,661,340 B1 | 12/2003 | Saylor et al. | |
| 6,731,649 B1 | 5/2004 | Silverman | |
| 6,738,351 B1 | 5/2004 | Qureshi et al. | |
| 6,757,276 B1 | 6/2004 | Harper et al. | |
| 6,862,622 B2 | 3/2005 | Jorgensen | |
| 7,020,128 B1 | 3/2006 | Gladden et al. | |
| 7,106,843 B1 | 9/2006 | Gainsboro et al. | |
| 7,154,914 B1 | 12/2006 | Pechner et al. | |
| 7,180,892 B1 | 2/2007 | Tackin | |
| 7,187,926 B1 | 3/2007 | Henkel | |
| 7,253,728 B2 | 8/2007 | Johan et al. | |
| 7,313,150 B2 | 12/2007 | Naudot et al. | |
| 7,508,816 B1 | 3/2009 | Everson et al. | |
| 8,416,769 B2 | 4/2013 | Lewis | |
| 8,483,245 B2 | 7/2013 | Madhavan et al. | |
| 8,509,223 B2 | 8/2013 | Mehta et al. | |
| 8,509,391 B2 | 8/2013 | Elliot et al. | |
| 8,510,416 B2 | 8/2013 | Johan et al. | |
| 8,520,670 B1 | 8/2013 | Giniger et al. | |
| 8,526,909 B2 | 9/2013 | Sennett et al. | |
| 8,531,286 B2 | 9/2013 | Friar et al. | |
| 8,571,993 B2 | 10/2013 | Kocher et al. | |
| 2001/0008556 A1 | 7/2001 | Bauer et al. | |
| 2002/0101854 A1 | 8/2002 | Siegrist et al. | |
| 2002/0150081 A1 | 10/2002 | Fang | |
| 2004/0248593 A1 | 12/2004 | Hicks et al. | |
| 2005/0105508 A1* | 5/2005 | Saha | 370/352 |
| 2005/0174935 A1 | 8/2005 | Segel | |
| 2006/0034255 A1 | 2/2006 | Benning et al. | |
| 2006/0098619 A1 | 5/2006 | Nix et al. | |
| 2006/0221983 A1 | 10/2006 | Cavgalar et al. | |
| 2007/0183317 A1 | 8/2007 | Vasseur et al. | |
| 2008/0005156 A1* | 1/2008 | Edwards et al. | 707/102 |
| 2008/0056469 A1* | 3/2008 | Preston et al. | 379/93.05 |
| 2008/0212619 A1 | 9/2008 | Scott et al. | |
| 2008/0285594 A1 | 11/2008 | Ray et al. | |
| 2009/0147690 A1 | 6/2009 | King | |
| 2009/0257345 A1 | 10/2009 | King | |
| 2013/0247128 A1 | 9/2013 | Hinchliffe et al. | |

OTHER PUBLICATIONS

NSGDatacom, "Automatic Voice and Data Fail-Over," pp. 1-5, no date, estimated Mar. 2009.
NonFinal Office Action in U.S. Appl. No. 12/270,697, Apr. 28, 2010.
Final Office Action in U.S. Appl. No. 12/270,697, Dec. 21, 2010.
NonFinal Office Action in U.S. Appl. No. 11/952,818, Sep. 18, 2009.
Final Office Action in U.S. Appl. No. 11/952,818, Feb. 12, 2010.
NonFinal Office Action in U.S. Appl. No. 11/952,818, Sep. 30, 2010.
NonFinal Office Action in U.S. Appl. No. 11/952,818, Apr. 20, 2011.
"Fax Relay TroubleShooting Guide," Cisco, Jun. 30, 2002.
"GSM Over Satellite," New Skies Satellites B.V., Apr. 2005, pp. 1-18.
NSGDatacom, Netrix Network Exchange 2005A, "Voice and Data Gateway for IP Services," datasheet, © 2006.
NSGDatacom, Netrix VoIPAK & VoIPZIP, "VoIP Network Optimization," datasheet, © 2008.
NSGDatacom, Netrix Nx2205D VoIPZIP, "Voice Compression Gateway for IP Services," datasheet, © 2006.
NSGDatacom, Netrix Network Exchange 2205D, "Voice and Data Gateway for IP Services," datasheet, © 2006.
NSGDatacom, Netrix NxCAS, "Cellular Analog Voice/Data Access Recovery and Backup," datasheet, © 2007.
NSGDatacom, Netrix Nx2222, "Bandwidth Optimization Router," datasheet, © 2007.
NSGDatacom, "Netrix Voice/Data Aggregation Products Enterprise Application," application brief, © 2006.
Crocker, Simon, "Circuit to Packet Solutions," Managed Services Made Easy in London, Jun. 14, 2007.
Schwartz, Eitan, "TDMoIP vs. VoIP: Matching Technology to Requirements," RAD Data Communications, Aug. 2003.
"T1/E1, T3/E3 and Multi-Line Voice Service: Commercial Services over Cable HFC and Fiber Infrastructures," RAD Data Communications, Mar. 2005.

* cited by examiner

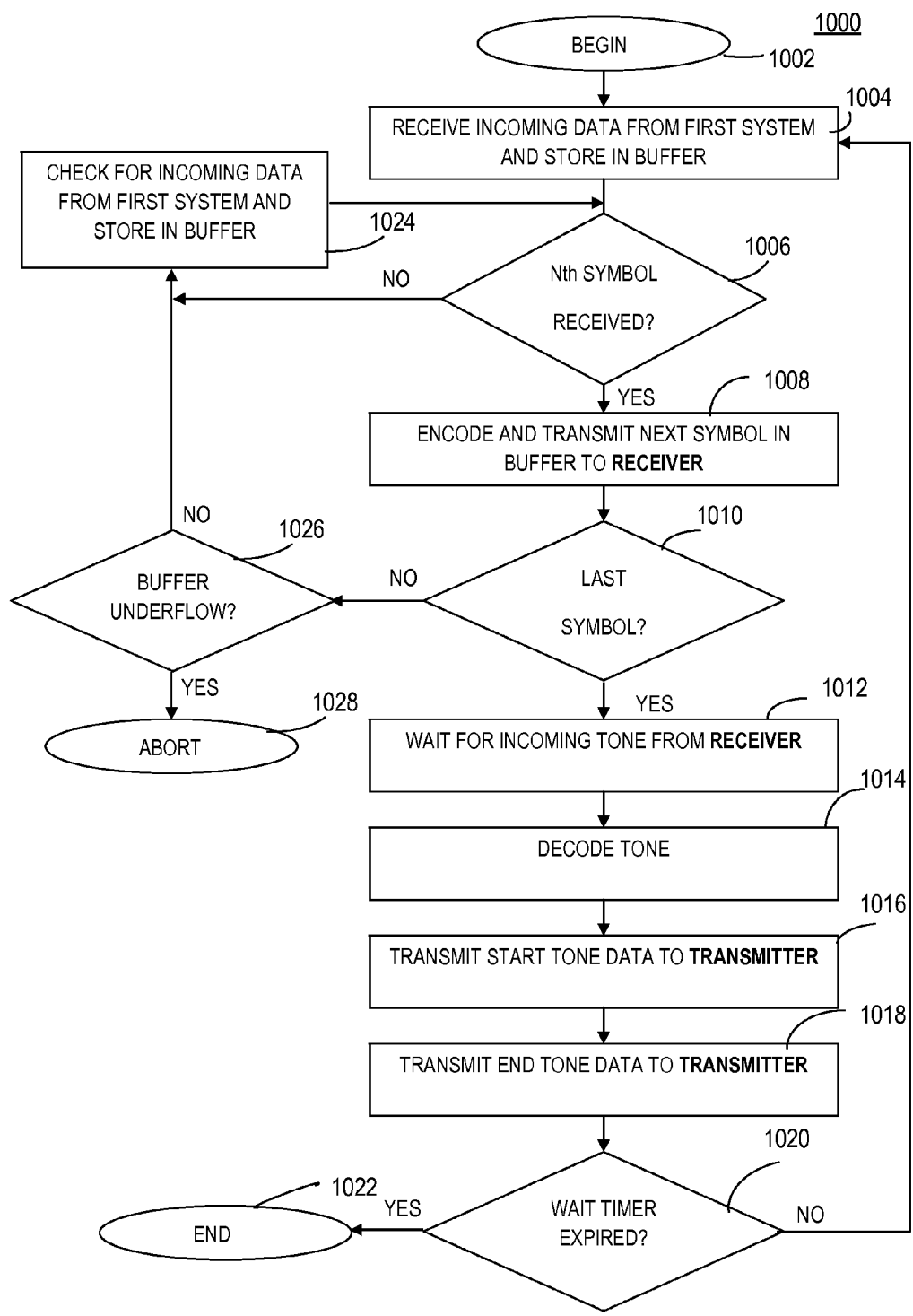
FIG. 10     EXEMPLARY SECOND SYSTEM

SYSTEM, METHOD, AND COMPUTER PROGRAM PRODUCT FOR CONNECTING OR COUPLING ANALOG AUDIO TONE BASED COMMUNICATIONS SYSTEMS OVER A PACKET DATA NETWORK

CROSS-REFERENCE TO RELATED APPLICATIONS

This application is a continuation-in-part of U.S. patent application Ser. No. 11/952,818, filed Dec. 7, 2007, and of common inventorship and assignee, the contents of which is incorporated herein by reference in its entirety. This application also has common inventorship and is of common assignee to U.S. patent application Ser. No. 12/270,697, filed Nov. 13, 2008, the contents of which is incorporated herein by reference in its entirety.

BACKGROUND OF INVENTION

1. Field of the Invention

The present invention relates generally to the transmission of analog audio tone based communications, and more particularly to such transmission over a packet data network.

2. Related Art

Many older 'legacy' telecommunications systems use dial-up telephone lines with analog modems to send data between equipment and digital computer systems. The modulator of a modulator/demodulator (modem) at one end of the telephone line converts digital data into an audio tone sequence that can be transmitted within the audio band of the standard telephone channel. At the other end of the line the demodulator of a second modem may decode the signal and convert it back into digital data.

In electronics and telecommunications, modulation is the process of varying one or more properties of a high-frequency periodic waveform, called the carrier signal, with a modulating signal which typically contains information to be transmitted. This is done in a similar fashion to a musician modulating a tone (a periodic waveform) from a musical instrument by varying its volume, timing and pitch. The three key parameters of a periodic waveform are its amplitude ("volume"), its phase ("timing") and its frequency ("pitch"). Any of these properties can be modified in accordance with a low frequency signal to obtain the modulated signal. Typically a high-frequency sinusoid waveform is used as carrier signal, but a square wave pulse train may also be used.

In telecommunications, modulation may include the process of conveying a message signal, for example, a digital bit stream or an analog audio signal, inside, e.g., another signal that can be physically transmitted. Modulation of a sine waveform may be used to transform a baseband message signal into a passband signal, for example a low-frequency audio signal into a radio-frequency signal (RF signal). In radio communications, cable TV systems or the public switched telephone network for instance, electrical signals can only be transferred over a limited passband frequency spectrum, with specific (non-zero) lower and upper cutoff frequencies. Modulating a sine-wave carrier makes it possible to keep the frequency content of the transferred signal as close as possible to the center frequency (typically the carrier frequency) of the passband.

A device that performs modulation is known as a modulator and a device that performs the inverse operation of modulation is known as a demodulator (sometimes detector or demod). A device that can do both operations is a modem (from "modulator-demodulator").

There are many standard modem protocols for communicating in this way over analog telephone lines. These standard protocols transfer information at speeds ranging from less than 75 to 56,000 bits/second or more. Typically the lower speed modems use Frequency Shift Keying (FSK) and are used by older equipment or in cases where the quality of the analog line is very poor. Higher speed modems also use Phase Shift Keying (PSK) or Quadrature Amplitude Modulation (QAM) but depend on a high quality audio connection and are much more susceptible to noise and small disturbances on the line than is FSK.

Because the quality of dial up lines still varies enormously, there are important legacy applications still in widespread use today for which a very low data rate modem is automatically chosen in order to minimize the possibility of errors during transmission.

For example, facsimile machines typically attempt to operate at a maximum speed of 14.4 Kbps, and start their communication by testing the quality of the line. In many cases they will negotiate a final transmission speed of 9,600 bps or slower. As a second example, many Point of Sale (POS) terminals and Automatic Teller Machines (ATM) always connect at the relatively slow speed of 2400 bps regardless of the quality of the connection. By connecting at low speed, the chance of errors that might cause a failure mid way through the transaction are minimized. A third example of low data rate legacy applications is alarm systems that use Dual Tone Multiple Frequency bursts of audio to send data at a data rate of less than 50 bits/second, but remain very resilient to line disturbances and noise. Alarm systems also sometimes use pulse modulation which operates by turning an audio carrier signal on or off at a very low rate, typically between 10 and 40 times a second.

Regardless of the data rate being used, all modems described above are designed to operate in real time when directly connected over the public switched telephone network (PSTN). In some cases the modems generate and receive a constant audio stream with no breaks in the signal. They are designed to operate within predefined line-quality and signal quality limits that are not always achieved. At the receiving end of a modem link any break in signal or short-term distortion in signal quality may result in data errors from which the application being run over the link may not recover.

A common requirement in telecommunications systems is to replace the dial up connection with an alternative connection, such as a wireless or terrestrial data packet network, without disturbing the equipment at either end of the dial up link. For example, it may be desirable to connect an existing alarm system to a cellular wireless data IP network in order to provide service in an area where landlines are unreliable. Such an application may be for use as the primary link or as an emergency backup to the dial network. In such cases it may be desirable to avoid the expense of upgrading the existing system to one that is "IP ready" but rather to use the IP network to transparently connect the two ends of the link. Often a modem is embedded in an expensive end device and cannot be bypassed without replacing the whole unit, for example in an ATM machine or in a Commercial HVAC system. At the other end of the link, access to the Legacy host or server system may also only be through dial-in lines. It is desirable under these circumstances for the legacy equipment at both ends of the link to operate substantially as each had previously with the PSTN line attached and that users of the equipment would experience no major changes in operation.

The general literature describes two conventional methods for attaching dial modems to packet data networks so that they may operate transparently to the attached equipment. These are known as Modem Passthrough and Modem Relay.

In the first method, modem passthrough, the analog signal from the modems at each end of the link is converted directly into a digital stream using an analog to digital converter at the analog input of a packet router or gateway. This digital representation of the audio signal normally takes the form of Pulse Code Modulation (PCM) and is passed over the network to the other end of the link in packet form without any decoding. Using modem passthrough, the receiving end of the link, the signal is regenerated exactly as it was received from the sending modem as if the two modems were still directly connected. The audio stream thereby generated normally conforms to the G.711 standard and has a data rate of 64 Kbps. G.711 is the digital audio standard used by the digital hierarchy of the PSTN, sometimes known as full rate voice, or toll quality voice. In this mode of operation the packet network effectively performs exactly the same functions as a standard digital telephone network, the primary difference being that the packet network introduces a substantial transmission delay that varies from packet to packet. This variation in delay is called jitter. Buffers in the end-point routers may absorb jitter to some extent, but there is always a trade-off between the magnitude of jitter that can be absorbed and the delay that can be tolerated by the applications running over the network. For many applications the delay and jitter of an IP network can exceed the operational response and timeout limitations of the attached systems and modem passthrough will not operate successfully, even for low data rate modems. Additionally, any significant packet loss during the call is likely to be fatal to the transmission. The problem is particularly acute where the packet network experiences relatively long delays, such as over satellite links, or where there is a wide variation in delay and a possibility of packet loss, such as with some wireless data services.

A common method of using modem passthrough is to connect an analog modem to an analog voice port on an IP router. IP routers designed to carry voice traffic using Voice over IP standards (VoIP) often work in the mode described above, where the incoming analog signal is converted directly to a G.711 compatible digital stream without any further processing. However many VoIP devices also compress the G.711 data to minimize the amount of data sent over the packet network, which may typically reduce the delay and jitter experienced. G.723, G.726, G.728, G.729 are examples of voice compression standards that are commonly used in VoIP systems, but there are a large number of other algorithms and standards in use. Using such voice compression techniques the data rate is reduced from full rate to a fraction. Many commonly used algorithms operate at an eighth rate or less. G.729 Annex B, for example, operates at 8 Kbps. All commonly used VoIP compression algorithms function by discarding information during the compression process with the result that the audio signal output at the receiving end of the link is a distortion of the input audio signal to some extent. The algorithms are structured to retain those qualities that optimize voice recognition by the human ear and not to retain the exact frequency and phase qualities of the incoming signal. As a result, the decoders of analog modems normally cannot decode signals that have been transmitted over VoIP systems that use compression. Even the very slowest DTMF and FSK modems do not operate when an attempt is made to use Modem Passthrough over a VoIP network with voice compression enabled.

In the second conventional method, modem relay maybe used to transfer dial modem traffic over a packet network. With Modem Relay the modem output is demodulated at the local router or gateway and is converted back to the original digital data before transmitting over the packet network. At the receiving router or gateway, the process is reversed and the modem signal is recreated converting the data stream back into the modem format required by the host or server system. A benefit of modem relay is the reduced amount of data that needs to be sent over the packet network. For this reason alone, modem relay systems are less likely to suffer from lost packets, which increase the likelihood of a transaction being successful. Nevertheless, the operational response and timeout limits of an application may cause a Modem Relay communication to fail, simply due to the unavoidable delay and jitter introduced by the use of the packet data network.

The wide deployment of embedded dial modems and similar communications devices that rely on tone based communications over PSTN lines makes it desirable to find an alternative method of connection that is easily deployed and more dependable. IP networks, and cellular wireless data services in particular, are the most widely deployed with very competitive pricing for relatively low bandwidth applications such as those described above. They are also ideal for emergency and backup applications. However IP networks, and cellular wireless data networks in particular, are not geared to support the transportation of frequency and phase sensitive communications signals or to supporting an analog system with critical timing windows, with the result that the conventional techniques of modem passthrough and modem relay do not work successfully for many such applications.

An alternative solution is needed to overcome shortcomings of conventional solutions.

SUMMARY OF THE INVENTION

The present invention sets forth various exemplary embodiments of apparat(us/i), system(s), method(s) and computer program product(s) for the transmission of audio tone based communications over a packet based data network.

An exemplary embodiment sets forth an automated system that may include a first system that may analyze the incoming signal from a first analog communications device operable to decode the incoming signal and may transmit the decoded information over a packet data network according to rules defined for the first system, and may further include a second system that may receive the information from the packet data network operable to generate an analog signal and transmit the signal to a second analog communications device, where such analog signal may be generated according to the received data and rules defined for the second system.

In an exemplary embodiment, the second system may also receive an incoming signal from the second analog communications device operable to decode the incoming signal and may transmit the decoded information over a packet data network according to rules defined for the second system, and the first system may receive information from the packet data network operable to generate an analog signal to the first communications device, where such analog signal maybe generated according to the received data and rules defined for the first system.

In an exemplary embodiment, the packet data network may be any network, such as, e.g., but not limited to, an internet protocol (IP) network that may operate over a terrestrial, a cable, a wireless and/or a satellite link and may have varying delay depending on the network performance at any particular time.

In an exemplary embodiment, the rules for the system may include a mechanism whereby decoded tone information may be held prior to transmission according to, e.g., but not limited to, a learned and/or pre-programmed timer value, and/or held indefinitely, and/or transmitted immediately upon recognition, dependent on operational parameters programmed into the exemplary system.

In another exemplary embodiment, the the first and second systems may be combined at the second location and the first analog communications device may connect to a packet data network using, e.g., but not limited to, a VoIP connection such that tone sequences may be received by the first system directly from a packet data network as compressed voice (VoIP) data and/or from a PSTN connection after passing through a VoIP to PSTN gateway device.

An exemplary embodiment sets forth an automated system, method, and/or computer program product for transmitting and receiving public switched telephone network (PSTN) compatible audio signals over a packet data network, which may include, in an exemplary embodiment, a first system operative to: receive incoming PSTN-compatible audio frequency signals; decode and interpret the incoming PSTN-compatible audio signals according to a message format and a modem protocol being used to obtain signal information; process the signal information according to at least one preprogrammed rule to generate an outgoing digital message; transmit the outgoing digital message to a second system over the packet data network; receive and interpret an incoming digital message from the second system; and encode and regenerate outgoing audio frequency signals.

The system according to an exemplary embodiment may include where the packet data network may include, e.g., but not limited to, an Internet protocol (IP) based network.

The system according to an exemplary embodiment may include where the packet network may include, e.g., but not limited to, a satellite based network.

The system according to an exemplary embodiment may include where the packet network may include, e.g., but not limited to, a wireless based network.

The system according to an exemplary embodiment may include where the packet network may include, e.g., but not limited to, one of, and/or a combination of more than one of, e.g., but not limited to, a cable, a fiber and/or an other type of terrestrial based network.

The system according to an exemplary embodiment may include where the system may further include a second system coupled to the first system operative to receive second incoming PSTN-compatible audio frequency signals; decode and interpret the second incoming PSTN-compatible audio signals according to a message format and a modem protocol being used to obtain second signal information; process the second signal information according to at least one preprogrammed rule to generate a second outgoing digital message; transmit the second outgoing digital message to the first system over the packet data network; receive and interpret a second incoming digital message from the first system; and encode and regenerate second outgoing audio frequency signals.

The system according to an exemplary embodiment may include where the first system and the second system are located one of, and/or a combination of more than one of, e.g., but not limited to, at a single location, and/or at different locations.

The system according to an exemplary embodiment may include where system may provide an ability to interface to a VoIP packet system.

The system according to an exemplary embodiment may further include where one of, and/or a combination of more than one of, e.g., but not limited to, compression, and/or decompression, of one of, and/or a combination of more than one of, e.g., but not limited to, PSTN, and/or VoIP, compatible audio signals.

The system according to an exemplary embodiment may include where the system uses one of, and/or a combination of more than one of, e.g., but not limited to, predetermined information, learned information, and/or preconfigured information, to determine the preprogrammed rules to apply to forwarding of messages between the first and second systems.

The system according to an exemplary embodiment may further include where a control channel may include, e.g., but not limited to, one of, and/or a combination of more than one of, e.g., but not limited to, an in-band control channel, and/or an out-of-band control channel, the control channel operable to remotely manage the first and second systems, and wherein the control channel is operable to provide communications to perform one of, and/or a combination of more than one of, e.g., but not limited to: provide monitoring function; provide a control function; determine real time diagnostic information; determine status information; and/or determine ancillary information.

The system according to an exemplary embodiment may include where the first system is operative to process one of, and/or a combination of more than one of, e.g., but not limited to, forward the signal information, delay the signal information, and/or discard the signal information.

An exemplary embodiment sets forth an automated system, method, and/or computer program product for transmitting and receiving public switched telephone network (PSTN) compatible audio signals over a packet data network, where the method may include: receiving first incoming PSTN-compatible audio frequency signals; decoding and interpreting the first incoming PSTN-compatible audio frequency signals according to a message format and a modem protocol being used obtaining first signal information; processing the first signal information according to at least one preprogrammed rule generating a first outgoing digital message; transmitting the first outgoing digital message from a first system to a second system over a packet data network; receiving and interpreting first incoming digital messages from a second system; and encoding and regenerating first outgoing audio frequency signals.

The method according to an exemplary embodiment may include where the packet data network may include, e.g., but not limited to, an Internet protocol (IP) based network.

The method according to an exemplary embodiment may include where the packet network may include, e.g., but not limited to, a satellite based network.

The method according to an exemplary embodiment may include where the packet network may include, e.g., but not limited to, a wireless based network.

The method according to an exemplary embodiment may include where the packet network may include, e.g., but not limited to, one of, and/or a combination of more than one of, e.g., but not limited to: a cable, a fiber, and/or an other type of terrestrial based network.

The method according to an exemplary embodiment may further include where receiving second incoming PSTN-compatible audio frequency signals; decoding and interpreting the second incoming PSTN-compatible audio frequency signals according to a message format and a modem protocol being used obtaining second signal information; processing the second signal information according to at least one preprogrammed rule generating a second outgoing digital message; transmitting the second outgoing digital message from the second system to the first system over the packet data network; receiving and interpreting a second incoming digital message from the first system; and encoding and regenerating a second outgoing audio frequency signal.

The method according to an exemplary embodiment may include where the first system and the second system are one of, and/or a combination of more than one of, e.g., but not limited to, at a single location, and/or at different locations.

The method according to an exemplary embodiment may further include where providing the ability to interface to a VoIP packet system.

The method according to an exemplary embodiment may further include where compressing and decompressing one of, and/or a combination of more than one of, e.g., but not limited to: PSTN-compatible, and/or VoIP-compatible, audio signals.

The method according to an exemplary embodiment may further include where using one of, and/or a combination of more than one of, e.g., but not limited to, predetermined information, learned information, and/or preconfigured information, in determining the preprogrammed rules to apply to the forwarding of messages between the first and second systems.

The method according to an exemplary embodiment may further include where using a control channel may include, e.g., but not limited to, one of, and/or a combination of more than one of, e.g., but not limited to, using an in-band control channel, and/or using an out-of-band control channel, the using the control channel may include, e.g., but not limited to, remotely managing the first and second systems, and wherein the using the control channel may include, e.g., but not limited to, providing communications performing one of, and/or a combination of more than one of, e.g., but not limited to: providing a monitoring function; providing a control function; determining real time diagnostic information; determining real time diagnostic information; determining status information; and/or determining ancillary information.

An exemplary embodiment sets forth an automated system, method, and/or computer program product, where the machine-readable medium that provides instructions, which when executed by a computing platform, causes the computing platform to perform operations, which may include a method for transmitting and receiving PSTN compatible audio signals over a packet data network, the method, which may include: receiving first incoming PSTN-compatible audio frequency signals; decoding and interpreting the first incoming PSTN-compatible audio frequency signals according to a message format and a modem protocol being used obtaining first signal information; processing the first signal information according to at least one preprogrammed rule generating a first outgoing digital message; transmitting the first ongoing digital message from a first system to a second system over the packet data network; receiving and interpreting first incoming digital messages from a second system; and encoding and regenerating first outgoing audio frequency signals.

The computer program product according to an exemplary embodiment where the method may include where the method may include, e.g., but not limited to, performing functions of the first system and the second system one of, and/or a combination of more than one of, e.g., but not limited to, at a single location, and/or at different locations.

An exemplary embodiment sets forth an automated system, method, and/or computer program product for transmitting and receiving public switched telephone network (PSTN) compatible audio signals which have passed over a packet data network, where the system may include: a first system operative to: receive incoming PSTN audio frequency signal information from at least one data packet, e.g., directly from the packet data network (e.g., voip packet, might be compressed, encrypted, etc.) and/or through an intermediate device such as a VoIP to PSTN gateway, etc.; decode and interpret (e.g., may include decompression, analyze the one and/or more tones, and interpreting underlying modem signal, possibly distorted) the incoming PSTN audio frequency signal information according to a message format and a modem protocol being used; process (e.g., clean up the signal and resend it, or, might store it, might store and forward, and/or block it, etc.) the incoming PSTN audio frequency signal information according to at least one preprogrammed rule; and encode and generate at least one outgoing PSTN-compatible audio frequency signal (e.g., and could then be provided to, e.g., a PSTN line, a modem, modem bank, modem device, analog and/or digital PSTN line).

In some exemplary embodiments, a first and a second system may be thought of as horizontal (a full signal path). In other exemplary embodiments, the first system and the second system may be considered as a vertical slice.

In certain system exemplary embodiments, an exemplary system one may interface to the PSTN on one end and may be coupled directly and/or indirectly through a PSTN gateway device to the packet data network on the other end, and then the exemplary system two may be coupled directly and/or indirectly through a PSTN gateway device to the packet data network on the first end and then to the PSTN on the other end.

In other exemplary embodiments, a packet network may be coupled directly and/or indirectly through a PSTN gateway device to an exemplary first system, the exemplary first system may then coupled to the PSTN; in the second exemplary system, the PSTN may be coupled to the second system, and then the exemplary second system may be coupled directly and/or indirectly through a PSTN gateway device to the packet data network.

The system according to an exemplary embodiment where the system may further include a second system, coupled to the first system, the second system operative to receive at least one incoming PSTN-compatible audio frequency signal; decode and interpret the at least one incoming PSTN-compatible audio signal according to a message format and a modem protocol being used to obtain second signal information; process (e.g., may process and/or just encapsulate) the second signal information according to at least one preprogrammed rule (e.g., rules could be dependent on signals from the first system, based on what was encoded and interpreted from the PSTN signal of the first system); generate (or regenerate) at least one data packet containing outgoing PSTN audio frequency signal information; and transmit the at least one data packet containing the outgoing PSTN audio frequency signal information over the packet data network.

The system according to an exemplary embodiment where the first and the second systems are operable to one of, and/or a combination of more than one of, e.g., but not limited to: share data; communicate; be part of the same and/or a different system; and/or run a different set of rules, (e.g., dependent on whether the data is coming from the PSTN and/or the packet data network, etc.).

An exemplary embodiment sets forth an automated system, method, and/or computer program product for transmitting and receiving public switched telephone network (PSTN) compatible audio signals directly over a packet data network and/or indirectly from a packet data network through a PSTN gateway device, where the method may include: receiving data from at least one data packet containing incoming PSTN audio frequency signal information from the packet data network; decoding and interpreting the incoming PSTN audio frequency signal information according to a message format and a modem protocol being used; processing the incoming PSTN audio frequency signal information according to at least one preprogrammed rule; and encoding and generating at least one outgoing PSTN-compatible audio frequency signal.

The method according to an exemplary embodiment where the method may further include receiving at least one incoming PSTN-compatible audio frequency signal; decoding and interpreting the at least one incoming PSTN-compatible audio signal according to a message format and a modem protocol being used to obtain second signal information; processing the second signal information according to at least one preprogrammed rule; generating at least one data packet containing outgoing PSTN audio frequency signal information; and transmitting the at least one data packet containing the outgoing PSTN audio frequency signal information over the packet data network.

The method according to an exemplary embodiment where the method may further include one and/or more of: sharing data between modules; communicating between the being part of the same and/or a different system; and/or wherein the processing may include, e.g., but not limited to, running a different set of rules.

An exemplary embodiment sets forth an automated system, method, and/or computer program product, where the machine-readable medium that provides instructions, which when executed by a computing platform, causes the computing platform to perform operations may include a method for transmitting and receiving public switched telephone network (PSTN) compatible audio signals received directly from a packet data network and/or indirectly through a PSTN gateway device, etc., the method may include: receiving data from at least one data packet containing incoming PSTN audio frequency signal information from the packet data network; decoding and interpreting the incoming PSTN audio frequency signal information according to a message format and a modem protocol being used; processing the incoming PSTN audio frequency signal information according to at least one preprogrammed rule; and encoding and generating at least one outgoing PSTN-compatible audio frequency signal.

The computer program product according to an exemplary embodiment where the method may include where receiving at least one incoming PSTN-compatible audio frequency signal; decoding and interpreting the at least one incoming PSTN-compatible audio signal according to a message format and a modem protocol being used to obtain second signal information; processing the second signal information according to at least one preprogrammed rule; generating at least one data packet containing outgoing PSTN audio frequency signal information; and transmitting the at least one data packet containing the outgoing PSTN audio frequency signal information over the packet data network.

The foregoing embodiments, together with embodiments directed to methods and products thereof, are described in greater detail below.

BRIEF DESCRIPTION OF THE DRAWINGS:

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

FIG. 10 depicts an exemplary flow diagram, according to an exemplary embodiment of yet another exemplary second system, in accordance with an exemplary embodiment.

DETAILED DESCRIPTION OF VARIOUS EXEMPLARY EMBODIMENTS OF THE INVENTION

Figure 1:
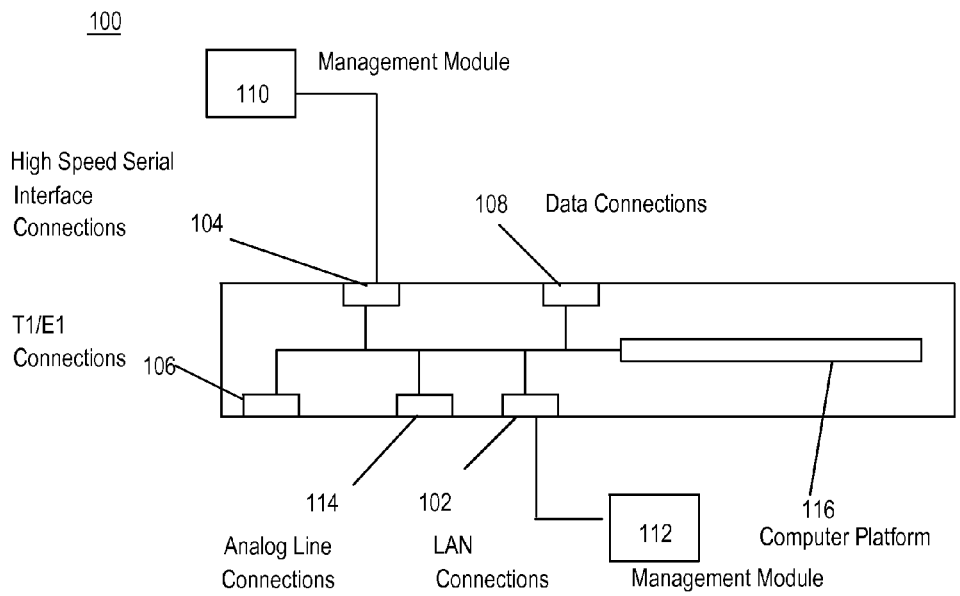
FIG. 1 illustrates an exemplary device in accordance with the present exemplary embodiments.

Various preferred exemplary embodiments of the invention including any preferred embodiments are discussed in detail below. While specific exemplary embodiments are discussed it should be understood that this is for illustrative purposes only and not be in way of limitation. A person skilled in the relevant art will recognize that other configurations, modifications, implementations and/or substantially similar alternative embodiments may be used without parting from the spirit and scope of the invention.

Introduction

Analog Public Switched Telephone Network (PSTN) lines are being phased out and replaced by packet data networks for many reasons. Packet data networks, such as X.25, Frame Relay and most recently IP (Internet Protocol), are widely accessible using terrestrial cable, wireless and satellite connections. They provide immediate, enhanced capability and are generally more cost effective than dial up telephone lines.

Whereas voice and modern computer communications can be easily moved from analog connections to digital packet networks, dial modems and similar tone based analog communications equipment is not so easily transferred. Although there are some standard methods employed to move systems from dial-up lines to packet data services, problems often arise that prevent the transfer being successful. In many cases the only dependable solution is for the analog equipment to be completely removed from the network, with a significant upgrade necessary to the installed equipment.

However the substantial investments in embedded dial modems and similar devices that rely on tone based communications often may make it impractical and/or cost prohibitive to replace the installed equipment with newer data technology. The present invention addresses this problem by providing a transparent and dependable system and method of transporting analog communications signals over a packet data network such that the attached systems operate as the systems did prior to the incorporation of use of the packet data network, with none of the significant and often expensive changes and/or upgrades required by conventional solutions.

Overview of Exemplary Embodiments

The exemplary embodiments may provide an apparatus, a method and/or computer program product for the transmission of analog and/or audio tone based communications over a packet based data network. In the exemplary embodiments, the system utilizing audio tone based communications may be an alarm system that may normally connect or couples to a centralized call center using an embedded dial modem and a PSTN line. The dial modem may use, e.g., but not limited to, FSK or DTMF audio tones for communications. The packet data network may be an, e.g., but not limited to, Internet Protocol (IP) network. For example, cellular wireless IP data connection or other IP network may be used to provide the primary or a backup connection from the alarm panel to the call center.

Exemplary Embodiments

The present exemplary embodiments can be performed by, e.g., but not limited to, one or more products available from NSGDatacom, Inc, of Chantilly, Va. USA and/or another, or an adaptation thereof in accordance with the present exemplary embodiments. Such exemplary products may include, e.g., but not limited to, devices 100 access router Wi-Modem™, access router V-Turbo™ and Network exchange Nx2222™ among others.

An exemplary device 100, may include, in an exemplary embodiment, a public switched telephone network (PSTN) and/or other data interfaces designed to connect and/or couple analog voice, facsimile, dial modem and/or data to e.g., but not limited to terrestrial, wireless, and/or satellite IP networks. The exemplary device 100 may have multiple exemplary interfaces of each of various types and function as a telecommunications switching platform for, e.g., but not limited to aggregating, optimizing and/or routing simultaneous calls over at least single IP network connection.

Referring to FIG. 1, device 100 may provide hardware, software, or a combination thereof to provide an integrated and/or scalable exemplary design. As shown, the exemplary device may include, e.g., but not limited to, multiple 10/100/1000 Ethernet LAN connections 102, one or more high speed serial interfaces 104, one or more Analog PSTN connections 106, and/or one or more data connections 108.

Exemplary LAN connections 102 may include, for example, but not limited to multiple integrated switched Ethernet interfaces, auto sensing enabled 10BaseT, 100BaseT or 1000BaseT user or hub connectivity, etc.

Exemplary high speed serial interfaces 104 may include, for example, but not limited to, RJ 45 interfaces, internal or external clocking, software configurable DTE/DCE, V.24/RS-232/V.35/RS-449,/X.21, and/or high speeds from, for example, but not limited to, 1200 bps to 2.048 Mbps etc. Exemplary connections may include, for example, but not limited to, X.25, Frame Relay NNI, UNI, FRF4/ITU, Q.933, Frame Relay Annex D, LMI, including PVC and/or SVC support, etc.

Exemplary T1/E1 connections 106 may provide, e.g., but not limited to, digital voice, fax, dial modem and/or data, up to multiple channels of voice compression, drop and insert for DS0/timeslots between interfaces, support for CAS and ISDN, transparent pass through for signaling via SS7, and/or transparent TDM clock recovery over IP, etc. Exemplary voice, and/or facsimile connections may include, for example, support for CAS/ISDN/E&M, H.323, SIP, B2BUA, G.711, G723, G.729a, CELP 4.8/7.4 kbps, ACELP 5.5/8.0 kbps, V.27ter, V.29 and/or Group III. Exemplary dial modem protocols may include, e.g., but not limited to, FSK, PSK, DTMF, QAM or Pulse modulation, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92, etc.

Exemplary data connections 108 may include internal and/or external clocking, software configurable DTE/DCE, V.24/RS-232/V.35/RS-449,/X.21, and/or speeds from, for example, but not limited to, 1200 bps to 2.048 Mbps, etc. Exemplary connections may include, for example, but not limited to, Asynchronous or Synchronous data, X.25, Frame Relay NNI, UNI, FRF4/ITU, Q.933, Frame Relay Annex D, LMI, including PVC and/or SVC support, etc.

Exemplary Analog line connections 114 may include, for example RJ 45 or RJ11 interfaces, FXS, FXO, E&M software configurable voice, fax, dial modem and/or data. Exemplary voice, and/or facsimile connections may include, for example, support for CAS/ISDN/E&M, H.323, SIP, B2BUA, G.711, G.729a, CELP 4.8/7.4 kbps, ACELP 5.5/8.0 kbps, V.27ter, V.29 and/or Group III. Exemplary dial modem protocols may include FSK, PSK, DTMF, QAM or Pulse modulation, Ademco Contact ID Protocol, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92.

A management module 110 may interface with device 100, through for example, high speed serial interface connections 104. Management module 110 may include, for example, a Graphical User Interface (GUI) hosted, for example, by a Microsoft Windows® PC, etc. Configuring, monitoring and troubleshooting over public, private or hybrid networks may be provided. Distributed management of existing equipment via Simple Network Management Protocol (SNMP) may also be provided.

Management may also be provided remotely. For example, a management module 112 may provide remote management support over exemplary T1/E1 connections 106 and/or 108. In an exemplary embodiment, device 100 is remotely configurable through a Telnet session through a remotely attached exemplary Microsoft Windows® PC, etc.

In one or more embodiments device 100 may include an internal or remotely accessible computer platform 116 that can perform any and all functions associated with internal processing and the foregoing network connections and associated protocols. The computer platform 116 can receive and execute software applications and display data transmitted from a management module or another computer device. The computer platform 116 may include an application-specific integrated circuit ("ASIC"), or other chipset, processor, microprocessor, logic circuit, Digital Signal Processor ("DSP"), or other data processing device. The ASIC or other processor may execute an application programming interface ("API") that interfaces with any resident programs, in a memory of the device 100. The API may be a runtime environment executing on the device 100, to operate to control the execution of applications on the device. The memory may include read-only and/or random-access memory (RAM and ROM), EPROM, EEPROM, flash cards, or any memory common to the computer platform 116. The computer platform 116 may also include a local database that can hold the software applications, or data not actively used in memory. The local database may include flash memory cells, or secondary storage, such as optical or magnetic media, tape, or soft or hard disk. In addition, computer platform 116 may be replaced by and/or may function in addition to any or all of the components of computer system 400 shown in FIG. 4.

In an exemplary embodiment, computer platform 116 may provide device 100 the capability to decode PSTN analog tones using standard DSP techniques and/or standard modem protocols. The computer platform 116 may also provide the capability to compress and uncompress voice traffic according to standard VoIP algorithms. Device 100 may support a mixture of both analog and/or digital PSTN voice connections with compression to a maximum of a predefined number of analog voice ports and/or digital (T1/E1) trunks per unit, with an overall maximum of voice, facsimile and/or data (DS0) circuits per unit. Analog voice ports may be configured for connection to a local PBX or to telephone handsets, facsimile or dial modems. The computer platform 116 may provide device 100 queue buffer, jitter buffer and/or echo cancellation mechanisms deployed to maintain quality over circuits with long and/or varying delays such as, e.g., but not limited to wireless, multiple, and/or satellite hops.

In an exemplary embodiment, computer platform 116 may provide, device 100 PSTN IP Gateway with Packet Switching capability via exemplary gateway and/or switching algorithms, etc. As interoperability is provided, device 100 may conform to, e.g., but not limited to, H.323 v2 and SIP (including B2BUA), enabling integration with soft switches and/or PC-based telephony. Device 100 may provide comprehensive gateway functions that may allow interfacing between different network services and types. For example, device 100 may interface to Voice over IP ("VoIP") networks, compress voice traffic over satellite or wireless connections, may simultaneously reduce the bandwidth used by a factor, and/or reduce the number of IP packets transmitted by a factor.

In an exemplary embodiment, computer platform 116 may provide device 100 with algorithms to, e.g., but not limited to, store, forward or hold indefinitely decoded modem tone signals according to rules programmed into the unit and/or learned by the unit. These embodiments, described in greater detail below, may incorporate analog audio tone based communications algorithms. In one or more such embodiments, analog audio tone based communications may be provided over exemplary packet data network links.

In an exemplary embodiment, computer platform 116 may provide device 100 with the ability to provide secure communications between platforms, using, for example, the processes of digital encryption, digital authentication, and/or digital key exchange, among others.

Figure 2:
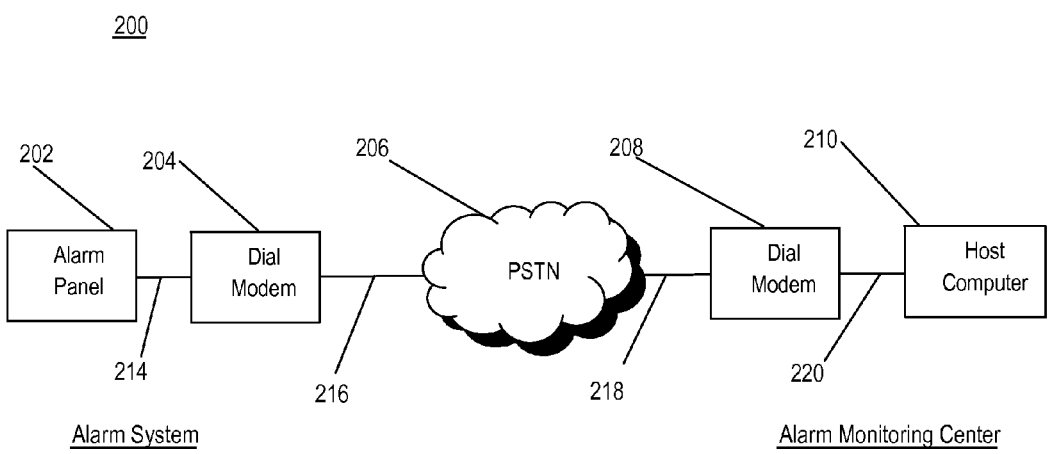
FIG. 2 illustrates an exemplary Alarm Panel connected to and/or coupled with an exemplary Host Computer System, which maybe at a centralized call center using, e.g., dial modems connected to and/or coupled to the Public Switched Telephone Network (PSTN) in accordance with the present embodiments.

FIG. 2 illustrates an exemplary alarm system 200 with exemplary alarm panel 202 connected to or coupled with a host computer using the PSTN 206. As shown, alarm panel 202 is linked to the host computer 210 via a dial modem 204, the PSTN 206, and dial modem 208.

In the illustrated exemplary embodiment, the dial modem 204 may be embedded in the alarm panel 202 such that the alarm panel 202, and dial modem 204 are inseparable. There may be one or more dial modems 204 and one or more connections 214 with a single alarm panel 202, which may connect to or be coupled with one or more standard analog telephone lines 216.

In the illustrated exemplary embodiment, the host computer 210 may connect to or coupled with the PSTN 206 through one or more dial modems 208 so that the host may support multiple simultaneous alarm calls. The host computer 210 may be connected to dial modems 208 using multiple individual serial connections couplings 220 or using a shared connection such as IP or X.25 utilizing additional networking devices not illustrated. Dial modems 208 may be embedded in an exemplary access server so that multiple simultaneous alarm calls may be supported by the host 210 using an exemplary shared access 218 to the PSTN 206, which may be include multiple analog or digital T1/E1 connections and may also include an exemplary standards-compliant clock regeneration and/or jitter buffering to synchronize remote locations to an exemplary central network.

In the exemplary embodiments the alarm panel 202 may connect or be coupled with to the host computer system 210 through the PSTN 206 in real time using standard dial modem 204, 208 or other tone based alarm panel protocols. The direct connection provided by the PSTN 206 may provide uninterrupted communication during the period of the call that may allow the modems 204, 208 to synchronize and/or communicate continuously for the duration of the call. In other exemplary embodiments, alternative communications networks may provide real time, uninterrupted communication, such as e.g., but not limited to, some satellite and/or some wireless networks as may be an operable alternative to the PSTN 206.

In another exemplary embodiment, a Very Small Aperture Terminal (VSAT) may provide a dedicated bandwidth link for the duration of an exemplary call and may allow modems to communicate successfully. VSAT terminals may include two-way satellite ground stations with an exemplary dish antenna typically smaller than 3 meters. VSATs may typically access satellites in geosynchronous orbit to relay data from small remote earth stations called terminals to other terminals in typically mesh configurations or master earth station hubs in star configurations. VSAT data rates may range from about narrowband up to approximately 4 Mbit/s. As used herein, the VSAT may share bandwidth in a time division mode. Demand assigned multiple access (DAMA) transmission may be used for an exemplary circuit-switched connection, wherein each user is permitted a slot of time on a demand (or request) basis.

In another exemplary embodiment, single channel per carrier/multiple channel per carrier (SCPC/MCPC) protocol transmission may be used. In exemplary embodiments, SCPC/MCPC may provide dedicated satellite link between a few distinct locations, where the links support either a single telephone line or several telephone or data lines. The links may, for example, be permanently assigned with no carrier switching or rerouting over the satellite.

In another embodiment, a circuit switched data connection or coupling over e.g., a cellular wireless network may provide a dedicated bandwidth link for the duration of a call and may allow modems to communicate successfully.

Figure 3:
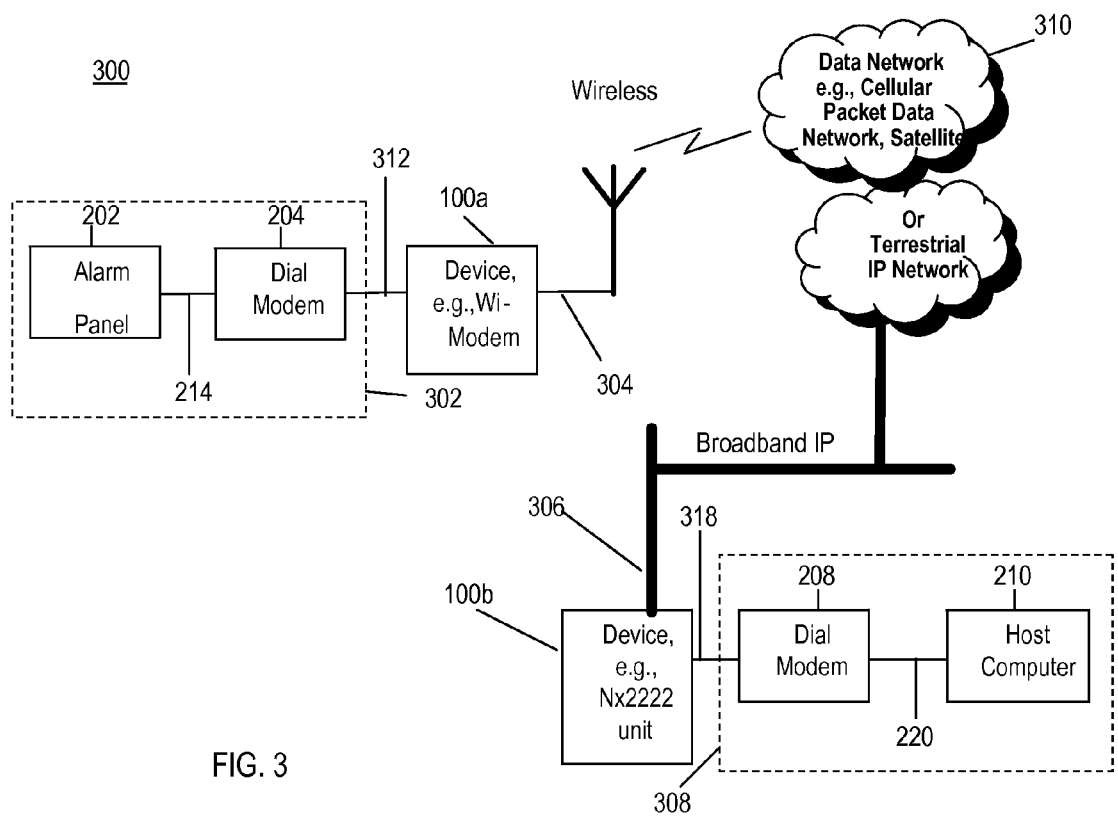
FIG. 3 illustrates an exemplary Alarm Panel connected to and/or coupled to an exemplary Host Computer System, which maybe at a centralized call center using an exemplary packet data network in accordance with various exemplary embodiments.

FIG. 3 illustrates an exemplary audio tone based communication over a packet based data network 300 in accordance with the present exemplary embodiments. Environment 300 may include the foregoing alarm system 200 with an exemplary cellular wireless IP data packet network replacing the PTSN 206. Environment 300 also illustrates an exemplary device 100a (left side) connected or coupled to the Alarm System 302, and another exemplary device 100b (right side) connected or coupled to the Alarm Monitoring Center 308.

In an exemplary embodiment, a connection or coupling may exist between the exemplary devices 100*a*, 100*b* and the dial modems 204, 208, which may employ any known telecommunications link. In an exemplary embodiment, link 312 and link 318 may each be either a single analog line or a TDM based trunk type, such as T1 or E1, and each of 312 and 318 may be across any combination of telecommunications equipment.

In an exemplary embodiment, a network connection may exist between the exemplary devices 100, which may employ any known protocol over any known telecommunications network. In an exemplary embodiment, any of links 304, 306, for example, may provide IP based connections or couplings over, e.g., but not limited to, an exemplary data network 310 such as, e.g., a cellular wireless, satellite or terrestrial IP data network.

In exemplary embodiments, analog modem tones may be transmitted from the alarm system 202 circuits of exemplary network 214, across link 312 to exemplary device 100*a*. Here, in exemplary device 100*a* the analog tones may be decoded and the decoded symbols transmitted over network links 304 and 306 to the second exemplary device 100*b*. Symbols received by the second exemplary device 100*b* may be converted into modem tones for transmission to the exemplary host 210 over network 220 of alarm monitoring center 308. In exemplary embodiment 300, the link 318 between exemplary device 100 and the alarm monitoring center 210, may be a digital T1/E1 connection capable of supporting multiple simultaneous calls, or a single analog connection, which persons skilled in the art will recognize as being functionally equivalent for the current purpose.

In exemplary embodiments, analog modem tones may be transmitted from the alarm monitoring center 308 of exemplary network 220, across link 318 to exemplary device 100*b*. Here, in exemplary device 100*b* the analog tones may be decoded and the decoded symbols transmitted over network links 306 and 304 to the exemplary device 100*a* connected or coupled to the alarm system 302. Symbols received by this exemplary device 100*a* may be converted into modem tones for transmission over link 312 to the exemplary alarm panel 202 of the alarm system 302.

As understood by skilled persons, networks 304 and 306 may also respectively represent portions of the same cellular wireless network or any other known data network. For example the devices may also be connected or coupled via an IP cable network, an X.25 or Frame Relay data packet network, or VSAT terminals (not shown) or other satellite communications enabling devices, etc. In exemplary embodiments, the respective VSAT uplink downlink may be connected over DAMA, SCPC, MCPC or other enabling protocols for transmission.

Figure 5:
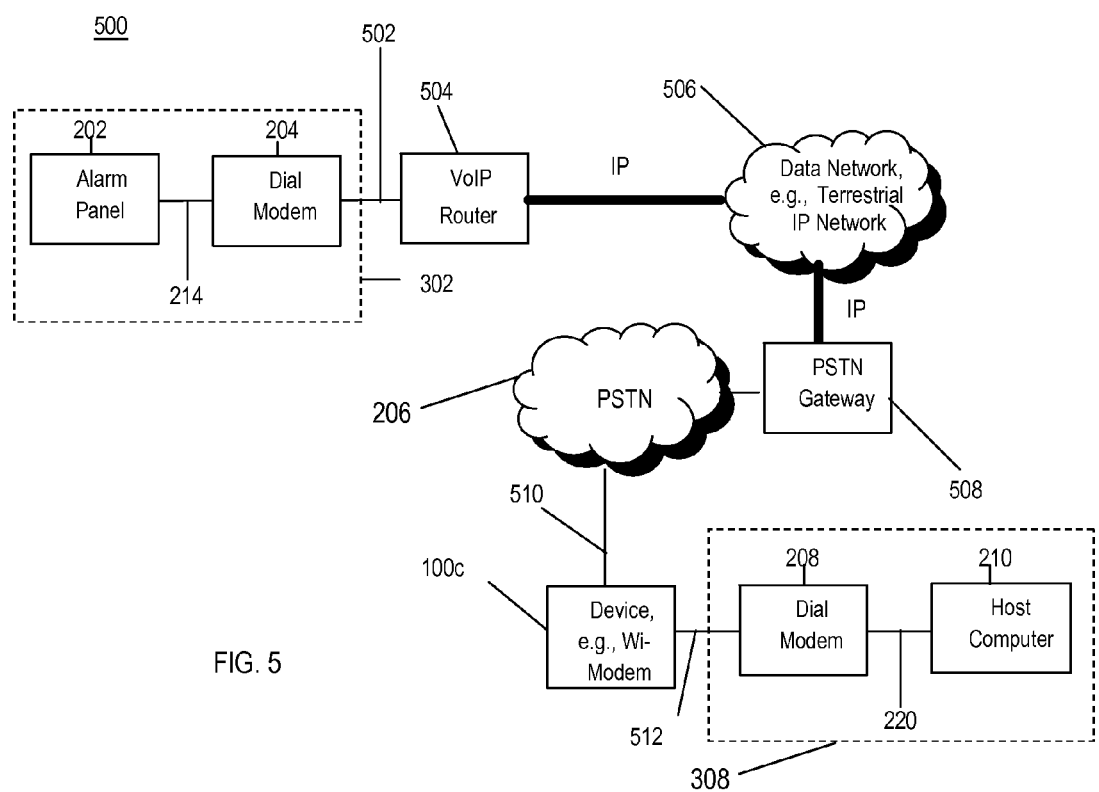
FIG. 5 illustrates an exemplary Alarm Panel connected to and/or coupled with an exemplary Host Computer System, which maybe at a centralized call center using, e.g., an exemplary packet data network in accordance with the various exemplary embodiments.

FIG. 5 illustrates an alternative exemplary embodiment of audio tone based communication 500 over a packet based data network 506 in accordance with the present invention. Environment 500 includes the foregoing alarm system 302 with an exemplary IP data packet network 506 replacing the PTSN 206. Environment 500 illustrates a standard VoIP router 504 connected or coupled to the Alarm System 302, and exemplary device 100*c* connected or coupled to the Alarm Monitoring Center 308.

In an exemplary embodiment, a connection or coupling may exist between the exemplary devices 504, 100*c* and the dial modems 204, 208, which may employ any known telecommunications link. In an exemplary embodiment, link 502 and link 512 may each be either a single analog line or a TDM based trunk type, such as T1 or E1, and each of 502, 512, 510 and 508 may be across any combination of telecommunications equipment.

In an exemplary embodiment, a network connection or coupling exist between the VoIP router 504 and exemplary device 100*c*, which may employ any known protocol over any known telecommunications network. In an exemplary embodiment, any of links 506, for example, may provide IP based connections. A gateway 508 may provide connection or coupling into the PSTN 206 for converting VoIP to a PSTN 206 compatible communications signal.

In exemplary embodiments, analog modem tones may be transmitted from the alarm system circuits of exemplary network 302, across link 502 to the VoIP router 504. Here, in the VoIP router 504 the analog tones may be converted to VoIP data packets and may be compressed using any known VoIP compression algorithm and transmitted over network 506, 508, 206, 510 to the exemplary device 100*c*. VoIP packets received by the exemplary device 100*c* may be analyzed and converted into modem tones for transmission to the alarm monitoring center 308 over link 512.

In exemplary embodiments, analog modem tones may be transmitted from the alarm monitoring center of exemplary network 308, across link 512 to exemplary device 100*c*. Here, in exemplary device 100*c* the analog tones may be received and retransmitted over network coupling or connection 510 over PSTN 206 to gateway 508. Here, the gateway 508 may convert the tones to VoIP data packets that may be compressed using any known VoIP compression algorithm and transmitted over network 506 to the VoIP router 504 connected to the alarm system 302. VoIP packets received by the VoIP Router 504 may be converted into modem tones for transmission to the alarm system 302 over link 502 via dial modem 204, and link 214 to alarm panel 202.

Figure 6A:
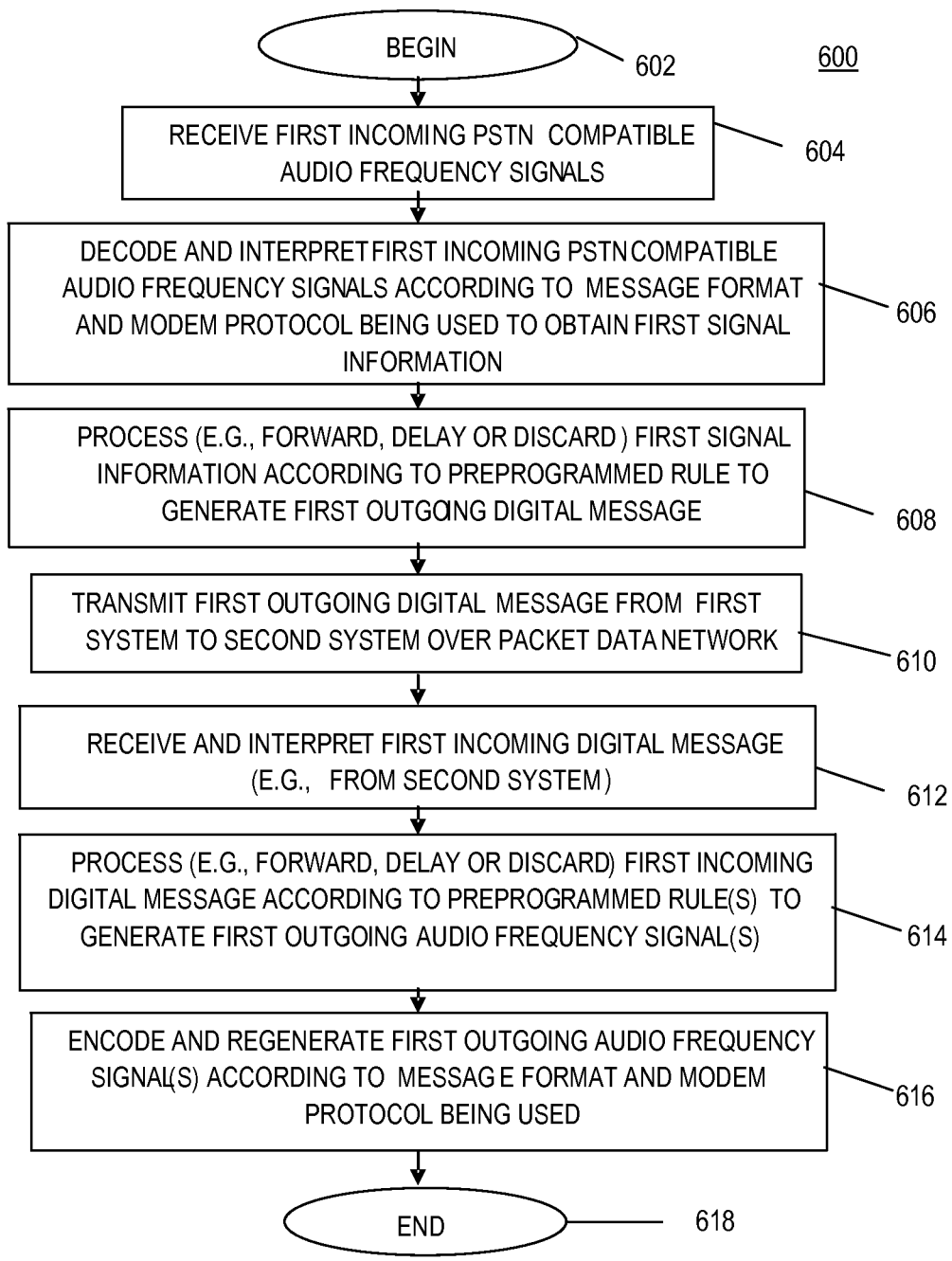
FIG. 6A depicts an exemplary flow diagram, according to an exemplary embodiment of an exemplary first system, in accordance with an exemplary embodiment.

FIG. 6A depicts an exemplary flow diagram 600, which, according to an exemplary embodiment, may describe exemplary functionality as may be performed by an exemplary first system embodiment. According to other exemplary embodiments, alternative exemplary system(s) need not necessarily perform any or all of the elements of flow diagram 600 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 600, according to an exemplary embodiment may begin with 602 and may continue immediately with 604.

In 604, an exemplary first system may receive exemplary first incoming PSTN-compatible audio frequency signals. From 604, flow diagram 600 may continue with 606.

In 606, the exemplary first system may decode and interpret first incoming PSTN-compatible audio frequency signals according to a message format and a modem protocol being used, and may obtain exemplary first signal information. From 606, flow diagram 600 may continue with 608.

In 608, the exemplary first system may process, i.e., may forward, delay, and/or discard, the first signal information according to one or more preprogrammed rule(s) to generate a first outgoing message. From 608, flow diagram 600 may continue with 610.

In 610, the exemplary first system may transmit first outgoing digital message from the first system to the second system over a packet data network. According to exemplary embodiments, the exemplary first system and exemplary second system may be at the same or different locations. According to exemplary embodiments, the first and second systems may be part of the same and/or different devices and/or systems. From 610, flow diagram 600 may continue with 612.

In 612, the exemplary first system may receive and interpret first incoming digital messages (e.g., from the exemplary second system. From 612, flow diagram 600 may continue with 614. Although not shown, it will be apparent to those skilled in the art that various steps of flow diagram 600, such as, e.g. but not limited to, 604 and 612, etc., may be performed in parallel, and continually, according to an alternative exemplary embodiment.

In 614, exemplary first incoming digital messages may be processed according to one or more preprogrammed rule(s) to generate outgoing audio frequency signals. From 614, flow diagram 600 may continue with 616, in an exemplary embodiment.

In 616, the exemplary first system may encode and regenerate first outgoing audio frequency signals, according to a message format and a modem protocol being used, according to an exemplary embodiment. From 616, flow diagram 600 may continue immediately to 618, where flow diagram 600 may end. In another exemplary embodiment, exemplary flow diagram 600 need not be in serial form, but may rather run 604, 606, 608 and 610, and in parallel, 612, 614, and 616, and may loop back continually to 604 and 612, respectively in an exemplary embodiment.

According to another exemplary embodiment, a second system may similarly perform the exemplary steps noted above with reference to FIG. 6A, communicating to an exemplary first system.

According to another exemplary embodiment, in addition to the exemplary first system according to FIG. 6A, the process may continue, e.g., with similar functionality by a second system in communication with the first system.

Figure 6B:
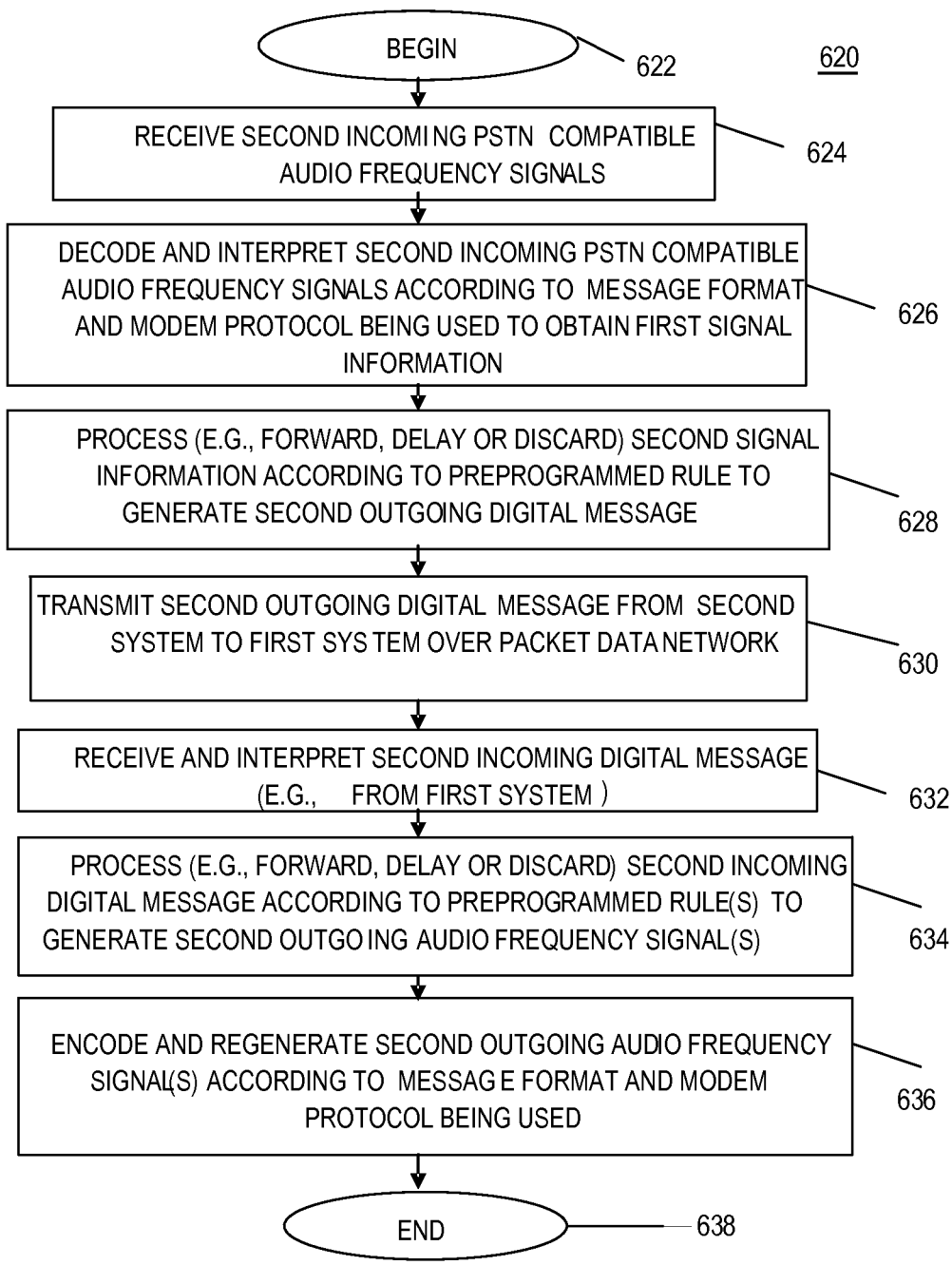
FIG. 6B depicts an exemplary flow diagram, according to an exemplary embodiment of an exemplary second system, in accordance with an exemplary embodiment.

FIG. 6B depicts an exemplary flow diagram 620, which, according to an exemplary embodiment, may describe exemplary functionality as may be performed by an exemplary second system exemplary embodiment. According to other exemplary embodiments, alternative exemplary system(s) need not necessarily perform any or all of the elements of flow diagram 620 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 620, according to an exemplary embodiment may begin with 622 and may continue immediately with 624.

In 624, an exemplary second system may receive exemplary second incoming PSTN-compatible audio frequency signals. From 624, flow diagram 620 may continue with 626.

In 626, the exemplary second system may decode and interpret first incoming PSTN-compatible audio frequency signals according to a message format and a modem protocol being used, and may obtain exemplary first signal information. From 626, flow diagram 620 may continue with 628.

In 628, the exemplary second system may process, i.e., may forward, delay, and/or discard, the second signal information according to one or more preprogrammed rule(s) to generate a second outgoing digital message. From 628, flow diagram 620 may continue with 630.

In 630, the exemplary second system may transmit the second outgoing digital message from the second system to the first system over the packet data network. According to exemplary embodiments, the exemplary first system and exemplary second system may be at the same or different locations. According to exemplary embodiments, the first and second systems may be part of the same and/or different devices and/or systems. From 630, flow diagram 620 may continue with 632.

In 632, the exemplary second system may receive and interpret second incoming digital messages (e.g., from the exemplary first system). From 632, flow diagram 620 may continue with 634. Although not shown, it will be apparent to those skilled in the art that various steps of flow diagram 620, such as, e.g. but not limited to, 624 and 632, etc., may be performed in parallel, and continually, according to an alternative exemplary embodiment.

In 634, exemplary second incoming digital message(s) may be processed according to one or more preprogrammed rule(s) to generate second outgoing audio frequency signal(s). From 634, flow diagram 620 may continue with 636, in an exemplary embodiment.

In 636, the exemplary second system may encode and generate (and/or regenerate) second outgoing audio frequency signals, according to a message format and a modem protocol being used, according to an exemplary embodiment. From 636, flow diagram 620 may continue immediately to 638, where flow diagram 620 may end. In another exemplary embodiment, exemplary flow diagram 620 need not be in serial form, but may rather run 624, 626, 628 and 630, and in parallel, 632, 634, and 636, and may loop back, e.g., continually to 624 and 632, respectively in an exemplary embodiment. Any reference to regeneration herein may also include generation.

According to another exemplary embodiment, a second system may similarly perform the exemplary steps noted above with reference to FIG. 6B, communicating to an exemplary first system.

According to another exemplary embodiment, in addition to the exemplary first system according to FIG. 6B, the process may continue, e.g., with similar functionality by a second system in communication with the first system.

Figure 7:
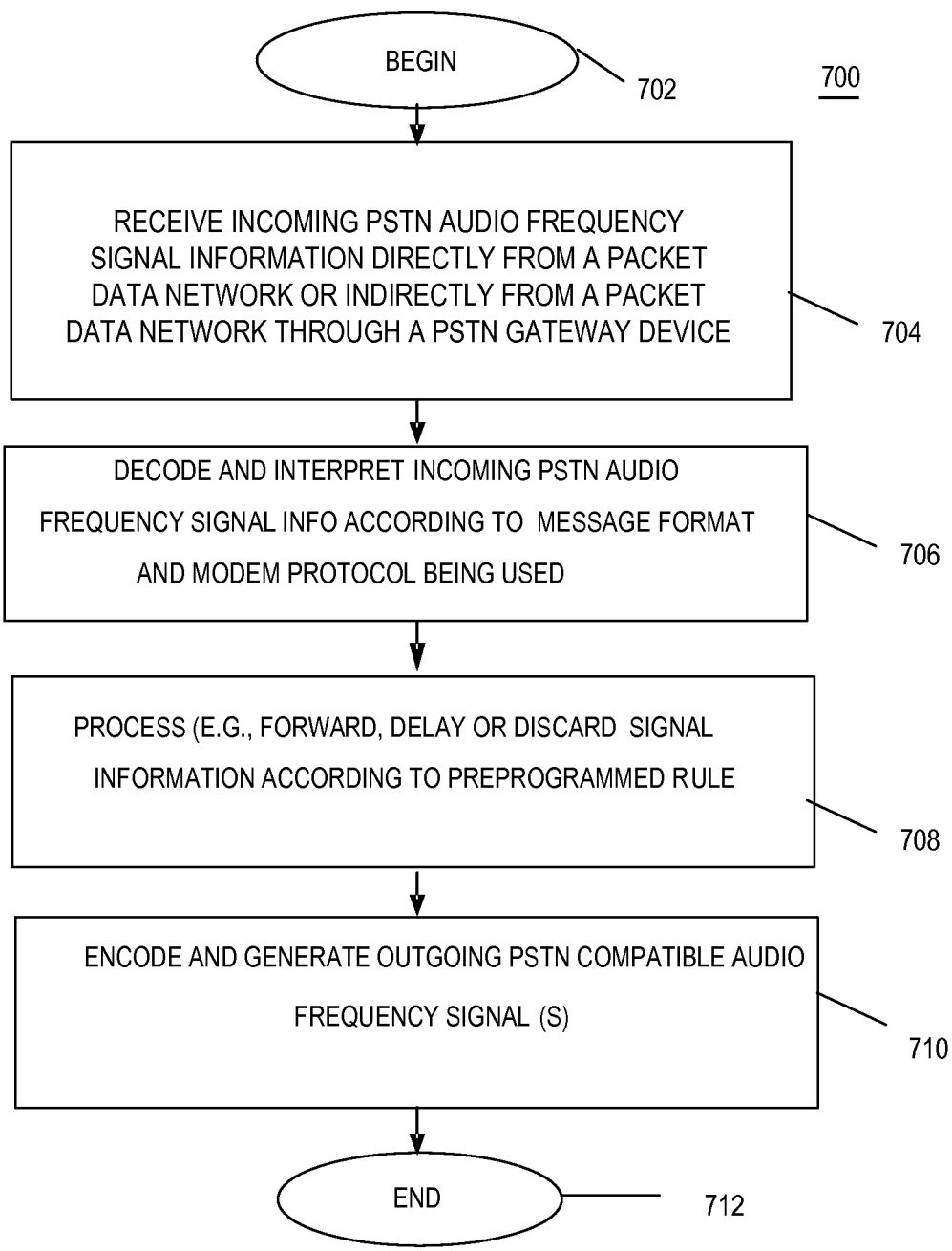
FIG. 7 depicts an exemplary flow diagram, according to an exemplary embodiment of another exemplary first system, in accordance with an exemplary embodiment.

FIG. 7 depicts an exemplary flow diagram 700, which, according to an exemplary embodiment, may describe exemplary functionality as may be performed by an exemplary combination system, which may refer to a first system, a second system, or one or more systems, subsystems and/or supersystems, according to various exemplary embodiments.

According to other exemplary embodiments, alternative exemplary system(s) need not necessarily perform any or all of the elements of flow diagram 700 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 700, according to an exemplary embodiment may begin with 702 and may continue immediately with 704.

In 704, according to an exemplary embodiment, an exemplary first system may receive a signal from the PSTN which may have passed through a packet network or may receive an exemplary packet and/or packets directly from a packet network which may contain first incoming PSTN audio frequency signal information, the packets may be passed through or may be received from a packet data network of any of several well known types including, e.g., but not limited to, terrestrial, satellite, optical, wireless, and/or wireline, etc. From 704, flow diagram 700 may continue with 706. PTSN audio frequency signal information may be in a VoIP packet, and may of course be compressed, etc.

In 706, the exemplary first system may decode and interpret the first incoming PSTN audio frequency signal information according to a message format and a modem protocol being used. From 706, flow diagram 700 may continue with 708. Decoding and/or interpreting may include in an exemplary embodiment, e.g., decompression, etc. analyzing the one or more tones, and/or interpreting underlying modem signal, which may be possibly distorted.

In 708, the exemplary first system may process, i.e., may forward, delay, and/or discard, the first signal information according to one or more preprogrammed rule(s). From 708, flow diagram 700 may continue with 710. Processing, according to an exemplary embodiment may include, e.g., but not limited to, cleaning up the signal and/or resending the signal, and/or storing it, or store and forward, and/or blocking the signal, etc.

In 710, the exemplary first system may encode and/or generate and/or regenerate outgoing PSTN compatible audio frequency signal(s). Encoding and/or generating, according to an exemplary embodiment, may be provided to, e.g., but not limited to, a PSTN line, a modem, modem bank, modem device, analog and/or digital PSTN line, etc. According to exemplary embodiments, the exemplary first system and exemplary second system may be at the same or different locations. According to exemplary embodiments, the first and second systems may be part of the same and/or different devices and/or systems. From 710, flow diagram 700 may continue with 712.

Although certain exemplary embodiments may have the first and second exemplary systems arranged horizontally (i.e., forming a full signal path), alternatively, in other exemplary embodiments, the first and second exemplary systems may be arranged vertically processing different types of exemplary traffic.

Specifically, in some exemplary embodiments (see, e.g., as illustrated in, FIGS. 3 and 6) an exemplary system one may interface to the PSTN on one end and may be coupled to the data network on the other end, and then the system two may be coupled to the data network on a first end and then to the PSTN on the other end.

In other alternative exemplary embodiments, (see FIGS. 5 and 7, for illustration) a packet data network may be, e.g., indirectly coupled to a first system through, e.g., a PSTN gateway device, or the like, the first system may then be coupled to the PSTN or PSTN compatible device, etc.; and then in the exemplary second system, the PSTN or PSTN compatible device may be coupled to the second system, and then the second system may be, e.g., indirectly coupled to the packet network through a PSTN gateway device.

In 712, flow diagram 700 may immediately end, according to an exemplary embodiment. Although not shown, it will be apparent to those skilled in the art that various steps of flow diagram 700, may be performed in parallel, serially, and/or continually, according to an alternative exemplary embodiment.

Figure 8:
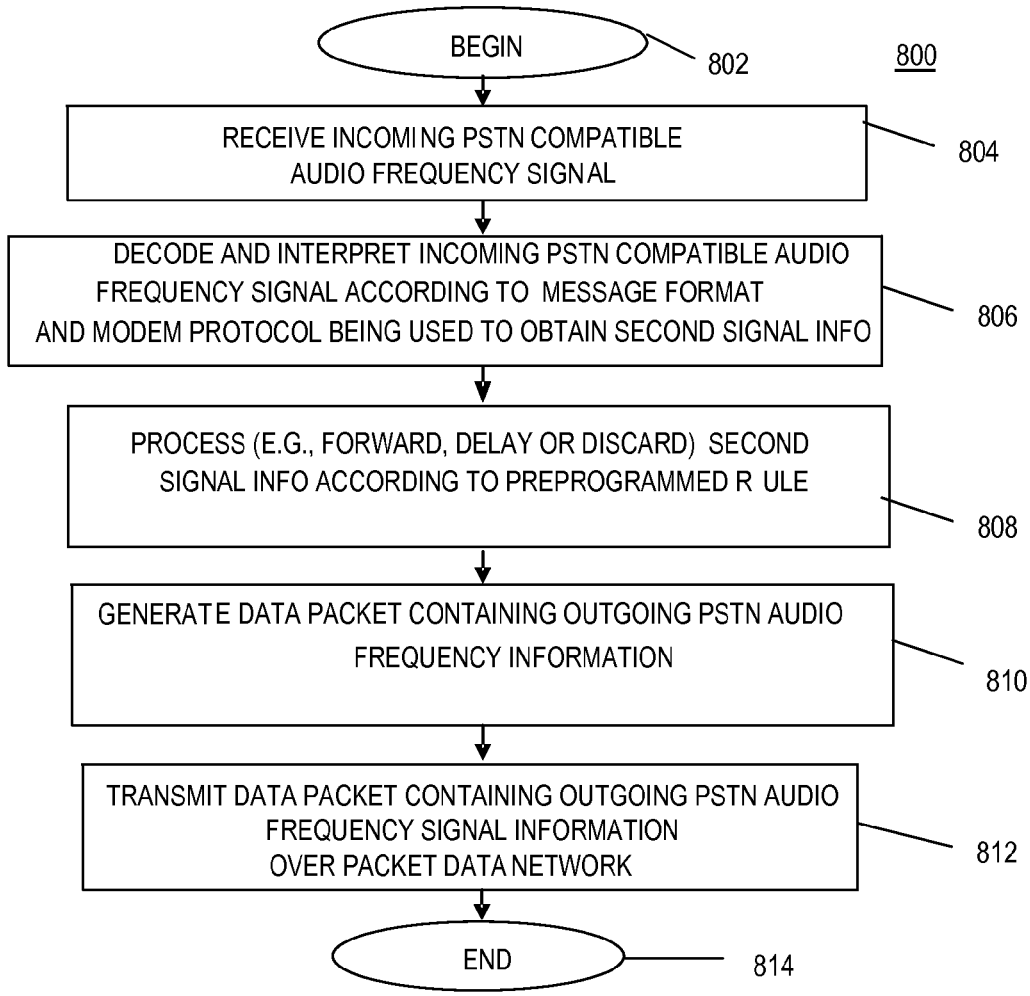
FIG. 8 depicts an exemplary flow diagram, according to an exemplary embodiment of another exemplary second system, in accordance with an exemplary embodiment.

According to another exemplary embodiment, in addition to the exemplary first system according to FIG. 7, the process may continue, e.g., with similar functionality by a second system in communication with the first system such as, e.g., but not limited to, the flow diagram of FIG. 8.

FIG. 8 depicts an exemplary flow diagram 800, which, according to an exemplary embodiment, may describe exemplary functionality as may be performed by an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 800 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 800, according to an exemplary embodiment may begin with 802 and may continue immediately with 804.

In 804, an exemplary second system may receive an exemplary incoming PSTN-compatible audio frequency signal. From 804, flow diagram 800 may continue with 806.

In 806, the exemplary second system may decode and interpret the first incoming PSTN-compatible audio frequency signal according to a message format and a modem protocol being used to obtain second signal information. From 806, flow diagram 800 may continue with 808.

In 808, the exemplary second system may process, (e.g., may process, or just encapsulate, processing may include forwarding, delaying, and/or discarding), the second signal information according to one or more preprogrammed rule(s). Exemplary rules could be dependent on, e.g., but not limited to, signals from the first system, based on what was encoded and interpreted from the PSTN signal of the first system, etc. From 808, flow diagram 800 may continue with 810.

In 810, the exemplary first system may generate and/or regenerate (and/or encode) outgoing PSTN audio frequency information. According to exemplary embodiments, the exemplary first system and exemplary second system may be at the same or different locations. According to exemplary embodiments, the first and second systems may be part of the same and/or different devices and/or systems. From 810, flow diagram 800 may continue with 812.

In 812, flow diagram 800 may transmit one or more data packet(s) containing outgoing PSTN Audio frequency signal information over a packet data network. The packets received from a packet data network of any of several well known types including, e.g., but not limited to, terrestrial, satellite, optical, wireless, and/or wireline, etc. From 812, flow diagram 800 may continue with 814.

In 814, flow diagram 800 may immediately end, according to an exemplary embodiment. Although not shown, it will be apparent to those skilled in the art that various steps of flow diagram 800, may be performed in parallel, serially, and/or continually, according to an alternative exemplary embodiment.

According to another exemplary embodiment, in addition to the exemplary second system according to FIG. 8, the process may continue (or proceed in parallel), e.g., with similar functionality by a second system in communication with the first system such as, e.g., but not limited to, the flow diagram of FIG. 7.

Figure 9:
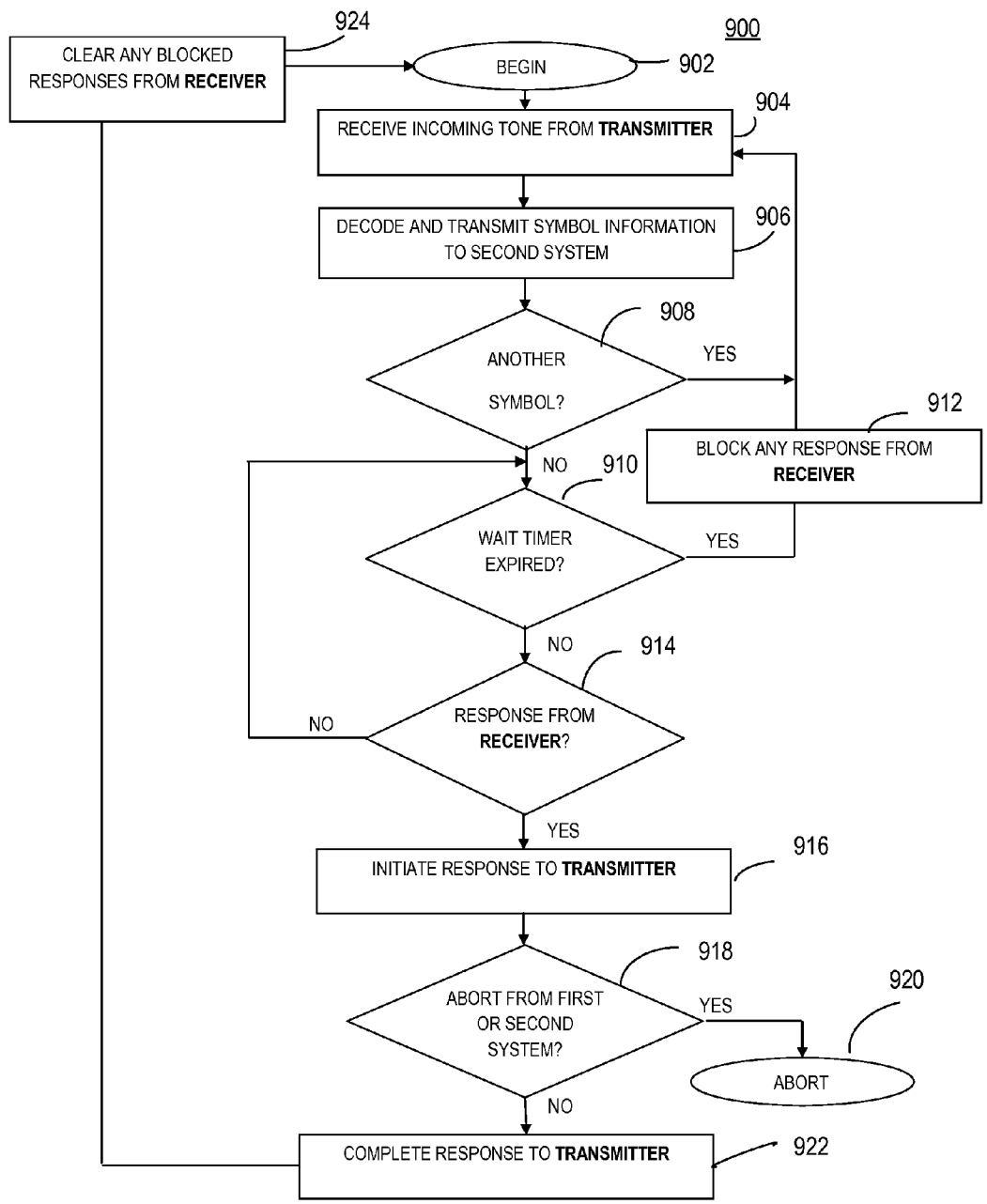
FIG. 9 depicts an exemplary flow diagram, according to an exemplary embodiment of yet another exemplary first system, in accordance with an exemplary embodiment.

FIG. 9 depicts an exemplary flow diagram 900, which, according to an exemplary embodiment, may describe exemplary functionality as may be performed by an exemplary first system, or part of an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 900 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 900, according to an exemplary embodiment may begin with 902 and may continue immediately with 904.

In 904, an exemplary first system may receive an incoming tone from the TRANSMITTER. From 904, flow diagram 904 may continue with 906.

In 906, the incoming tone may be decoded and symbol information may be transmitted to a second system. From 906, flow diagram 900 may continue with 908.

In 908, as illustrated in exemplary flow diagram 900, system logic may determine whether another symbol has been decoded or may be expected and if so, then flow diagram 900 may continue with 904 to receive an additional incoming tone. If there is not another symbol, then flow diagram 900 may continue with 910.

In 910, as illustrated in exemplary flow diagram 900, system logic may determine if an exemplary timer has expired, and if not yet expired, the flow diagram may continue with 914, and if the wait timer has expired, then flow diagram 900 may alternatively continue with 912, according to an exemplary embodiment.

In 912, a response received from the RECEIVER may be blocked, and flow diagram 900 may continue with 904.

In 914, as illustrated in exemplary flow diagram 900, system logic may determine whether a response was received from the RECEIVER, and if so, then flow diagram may continue with 916, and if no response was received from the RECEIVER, then flow diagram 900 may continue to wait by continuing with 910.

In 916, as illustrated in exemplary flow diagram 900, system logic may initiate a response to the TRANSMITTER even though the complete response has not been received from the RECEIVER. From 916, flow diagram 900 may continue with 918.

In 918, as illustrated in exemplary flow diagram 900, system logic may determine whether the system has received an abort from either the first and/or the second system, and if an abort has been received from either system, then flow diagram 900 may continue with 920, and is no such abort has been received from either the first or second system, then flow diagram 900 may continue with 922.

In 922, as illustrated in exemplary flow diagram 900, system logic may transmit a complete response to the TRANSMITTER. From 922, flow diagram 900 may continue with 924.

In 924, as illustrated in exemplary flow diagram 900, system logic may clear any blocked responses received from the RECEIVER by deleting such blocked responses From 924, flow diagram 900 may continue with 902.

The exemplary process as illustrated in exemplary flow diagram 900, provides exemplary, but nonlimiting, system logic as may process, i.e., may forward, delay, and/or discard, the symbol information received according to one or more preprogrammed rule(s), as illustrated in FIG. 9.

FIG. 10 depicts an exemplary flow diagram 1000, which, according to an exemplary embodiment, may describe exemplary functionality as may be performed by an exemplary second system, or part of an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 1000 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 1000, according to an exemplary embodiment may begin with 1002 and may continue immediately with 1004.

In 1004, an exemplary second system may receive exemplary data from a first system and may store the incoming data in a buffer. From 1004, flow diagram 1000 may continue with 1006.

In 1006, as illustrated in flow diagram 1000, logic of the exemplary system may determine whether an N-th Symbol has been received, and if the Nth symbol has been received, then flow diagram 1000 may continue with 1008, and if the Nth symbol has not yet been received, then flow diagram 1000 may continue with 1024.

In 1024, as illustrated in flow diagram 1000, logic of the exemplary second system may check for incoming data from the first system and may store such incoming data in a buffer, and flow diagram 1000 may continue with 1006.

In 1008, as illustrated in flow diagram 1000, logic of the exemplary second system may encode a next symbol in the buffer and may transmit the next symbol to a receiver. From 1008, flow diagram 1000 may continue with 1010.

In 1010, illustrated in flow diagram 1000, exemplary logic of the exemplary second system may determine whether the last symbol has been received, and if the last symbol has been received, then flow diagram 1000 may continue with 1012, and if the last symbol is determined not to have been received, then flow diagram 1000 may continue with 1026.

In 1026, as illustrated in flow diagram 1000, logic of the exemplary second system may determine whether a buffer underflow condition exists, and if so, then flow diagram may continue with 1028 aborting flow diagram 1000, and if it is determined that no buffer underflow condition exists, then flow diagram 1000 may continue with 1024.

In 1012, as illustrated in flow diagram 1000, logic of the exemplary second system may wait for an incoming tone from the RECEIVER, and then upon receipt, flow diagram 1000 may continue with 1014.

In 1014, as illustrated in flow diagram 1000, logic of the exemplary second system may decode the tone, and flow diagram 1000 may continue with 1016.

In 1016, as illustrated in flow diagram 1000, logic of the exemplary second system may transmit start of tone data to the TRANSMITTER. From 1016, flow diagram 1000 may continue with 1018.

In 1018, as illustrated in flow diagram 1000, logic of the exemplary second system may transmit end of tone data to the TRANSMITTER. From 1018, flow diagram 1000 may continue with 1020.

In 1020, as illustrated in flow diagram 1000, exemplary logic of the exemplary second system may determine whether a wait time has expired, and if the wait time has expired, flow diagram 1000 may continue with 1022, which may immediately end, and if in 1020, the wait time is deemed not to have expired yet, then flow diagram 1000 may continue with 1004.

It is important to note that all exemplary flow diagrams are deemed to be of an example nature, and are intended not to be limited, but rather exemplary in nature to ease those of ordinary skill in the relevant art to more easily make and use the claimed inventions. Although not shown, it will be apparent to those skilled in the art that various steps of flow diagram 1000, may be performed in parallel, serially, and/or continually, according to an alternative exemplary embodiment.

According to another exemplary embodiment, in addition to the exemplary second system according to FIG. 10, the process may continue (or proceed in parallel), e.g., with similar functionality by a second system in communication with the first system such as, e.g., but not limited to, the flow diagram of FIG. 9.

Fundamental Digital Modulation Methods

The most fundamental digital modulation techniques are based on keying:

In the case of PSK (phase-shift keying), a finite number of phases are used.

In the case of FSK (frequency-shift keying), a finite number of frequencies are used.

In the case of ASK (amplitude-shift keying), a finite number of amplitudes are used.

In the case of QAM (quadrature amplitude modulation), a finite number of at least two phases, and at least two amplitudes are used.

In QAM, an inphase signal (the I signal, for example a cosine waveform) and a quadrature phase signal (the Q signal, for example a sine wave) are amplitude modulated with a finite number of amplitudes, and summed. It can be seen as a two-channel system, each channel using ASK. The resulting signal is equivalent to a combination of PSK and ASK.

In all of the above methods, each of these phases, frequencies or amplitudes are assigned a unique pattern of binary bits. Usually, each phase, frequency and/or amplitude encodes an equal number of bits. This number of bits comprises the symbol that is represented by the particular phase, frequency or amplitude.

If the alphabet consists of $M=2^N$ alternative symbols, each symbol represents a message consisting of N bits. If the symbol rate (also known as the baud rate) is $f_S$ symbols/second (or baud), the data rate is $Nf_S$ bit/second.

For example, with an alphabet consisting of 16 alternative symbols, each symbol represents 4 bits. Thus, the data rate is four times the baud rate.

In the case of PSK, ASK or QAM, where the carrier frequency of the modulated signal is constant, the modulation alphabet is often conveniently represented on a constellation diagram, showing the amplitude of the I signal at the x-axis, and the amplitude of the Q signal at the y-axis, for each symbol.

Modulator and Detector Principles of Operation

PSK and ASK, and sometimes also FSK, are often generated and detected using the principle of QAM. The I and Q signals can be combined into a complex-valued signal I+jQ (where j is the imaginary unit). The resulting so called equivalent lowpass signal or equivalent baseband signal is a complex-valued representation of the real-valued modulated physical signal (the so called passband signal or RF signal).

Exemplary general steps and/or features, which may be used by the modulator to transmit data may include, e.g., but not limited to:

1. Group the incoming data bits into codewords, one for each symbol that will be transmitted;
2. Map the codewords to attributes, for example amplitudes of the I and Q signals (the equivalent low pass signal), or frequency or phase values;

3. Adapt pulse shaping or some other filtering to limit the bandwidth and form the spectrum of the equivalent low pass signal, typically using digital signal processing;
4. Perform digital-to-analog conversion (DAC) of the I and Q signals (since today all of the above is normally achieved using digital signal processing, DSP);
5. Generate a high-frequency sine wave carrier waveform, and perhaps also a cosine quadrature component. Carry out the modulation, for example by multiplying the sine and cosine wave form with the I and Q signals, resulting in that the equivalent low pass signal is frequency shifted into a modulated passband signal or RF signal. Sometimes this is achieved using DSP technology, for example direct digital synthesis using a waveform table, instead of analog signal processing. In that case the above DAC step should be done after this step; and/or
6. Amplification and analog bandpass filtering to avoid harmonic distortion and periodic spectrum.

At the receiver side, the demodulator may typically perform, e.g., but not limited to:
1. Bandpass filtering;
2. Automatic gain control (AGC) (to compensate for attenuation, for example fading);
3. Frequency shifting of the RF signal to the equivalent baseband I and Q signals, or to an intermediate frequency (IF) signal, by multiplying the RF signal with a local oscillator sinewave and cosine wave frequency (see the superheterodyne receiver principle);
4. Sampling and analog-to-digital conversion (ADC) (Sometimes before or instead of the above point, for example by means of undersampling);
5. Equalization filtering, for example a matched filter, compensation for multipath propagation, time spreading, phase distortion and frequency selective fading, to avoid intersymbol interference and symbol distortion;
6. Detection of the amplitudes of the I and Q signals, or the frequency or phase of the IF signal;
7. Quantization of the amplitudes, frequencies or phases to the nearest allowed symbol values;
8. Mapping of the quantized amplitudes, frequencies or phases to codewords (bit groups);
9. Parallel-to-serial conversion of the codewords into a bit stream; and/or
10. Pass the resultant bit stream on for further processing such as removal of any error-correcting codes.

As is common to all digital communication systems, the design of both the modulator and demodulator must be done simultaneously. Digital modulation schemes are possible because the transmitter-receiver pair have prior knowledge of how data is encoded and represented in the communications system. In all digital communication systems, both the modulator at the transmitter and the demodulator at the receiver are structured so that they perform inverse operations.

Non-coherent modulation methods do not require a receiver reference clock signal that is phase synchronized with the sender carrier wave. In this case, modulation symbols (rather than bits, characters, or data packets) are asynchronously transferred. The opposite is coherent modulation.

List of Common Digital Modulation Techniques

The most common digital modulation techniques are:
Phase-shift keying (PSK):
    Binary PSK (BPSK), using M=2 symbols
    Quadrature PSK (QPSK), using M=4 symbols
    8PSK, using M=8 symbols
    16PSK, using M=16 symbols
    Differential PSK (DPSK)
    Differential QPSK (DQPSK)
    Offset QPSK (OQPSK)
    π/4-QPSK Frequency-shift keying (FSK):
    Audio frequency-shift keying (AFSK)
    Multi-frequency shift keying (M-ary FSK or MFSK)
    Dual-tone multi-frequency (DTMF)
    Continuous-phase frequency-shift keying (CPFSK)
Amplitude-shift keying (ASK)
On-off keying (OOK), the most common ASK form
    M-ary vestigial sideband modulation, for example 8VSB
Quadrature amplitude modulation (QAM)—a combination of PSK and ASK:
    Polar modulation like QAM a combination of PSK and ASK.
Continuous phase modulation (CPM) methods:
    Minimum-shift keying (MSK)
    Gaussian minimum-shift keying (GMSK)
Orthogonal frequency-division multiplexing (OFDM) modulation:
    discrete multitone (DMT)—including adaptive modulation and bit-loading.
Wavelet modulation
Trellis coded modulation (TCM), also known as trellis modulation
Spread-spectrum techniques:
    Direct-sequence spread spectrum (DSSS)
    Chirp spread spectrum (CSS) according to IEEE 802.15.4a CSS uses pseudo-stochastic coding
    Frequency-hopping spread spectrum (FHSS) applies a special scheme for channel release MSK and GMSK are particular cases of continuous phase modulation. Indeed, MSK is a particular case of the sub-family of CPM known as continuous-phase frequency-shift keying (CPFSK) which is defined by a rectangular frequency pulse (i.e. a linearly increasing phase pulse) of one symbol-time duration (total response signaling).

OFDM is based on the idea of frequency-division multiplexing (FDM), but is utilized as a digital modulation scheme. The bit stream is split into several parallel data streams, each transferred over its own sub-carrier using some conventional digital modulation scheme. The modulated sub-carriers are summed to form an OFDM signal. OFDM is considered as a modulation technique rather than a multiplex technique, since it transfers one bit stream over one communication channel using one sequence of so-called OFDM symbols. OFDM can be extended to multi-user channel access method in the orthogonal frequency-division multiple access (OFDMA) and multi-carrier code division multiple access (MC-CDMA) schemes, allowing several users to share the same physical medium by giving different sub-carriers or spreading codes to different users.

Of the two kinds of RF power amplifier, switching amplifiers (Class C amplifiers) cost less and use less battery power than linear amplifiers of the same output power. However, they only work with relatively constant-amplitude-modulation signals such as angle modulation (FSK or PSK) and CDMA, but not with QAM and OFDM. Nevertheless, even though switching amplifiers are completely unsuitable for normal QAM constellations, often the QAM modulation principle are used to drive switching amplifiers with these FM and other waveforms, and sometimes QAM demodulators are used to receive the signals put out by these switching amplifiers.

First Exemplary Embodiment for Connecting or Coupling Analog Audio Tone Based Communications Systems over a Packet Data Network In an exemplary embodiment, devices 100 (i.e., 100a, 100b) may provide the ability to receive PSTN 206 signals, such as, for example, e.g., but not limited to, from an analog line or from a TDM link, and decode these signals. While exemplary attributes such as PSTN 206 line, analog line, FXS, FXO, E&M, TDM link, or T1 and E1 trunks may be described, the foregoing terminology are employed for illustrative purposes only and are in no way to be construed as limitations of the present embodiments.

In an exemplary embodiment, devices 100a, 100b may provide the ability to convert between transmission protocols, such as, e.g., but not limited to, from a TDM data structure to IP, and back again. An exemplary feature of the equipment described may be the ability to provide a connection path for TDM links as transparently as possible to the systems connected at both ends, regardless of the transport medium and any intermediate protocols used to provide the connection. Two variables that may be accommodated in order for the proposed solution to be flexible and operate with a wide variety of potential network solutions include, e.g., but are not limited to, (i) accommodation for a wide potential variation in time delay across the network path, and (ii) buffering to allow the continuous operation of the transmission protocol, such as, e.g., exemplary TDM circuits, while receiving and transmitting discontinuous data packets over the network, such as, e.g., exemplary IP connection or coupling (for example, to compensate for gaps between blocks of information received from the IP packet data network 310 that need to be continuously transmitted without a break over the TDM circuit).

As outlined above, the basic method of operation of an IP packet based data network 310, 506 may include that of accumulating information for a period of time and then transmitting it in a burst of data known as a packet. There is therefore a period of accumulation during which time the data may be stored at the transmitting end of the link, a processing delay while the "packet" is created, a period of packet transmission, a period of accumulation at the receiving end of the link, a period of processing at the receiving end of the link and finally a period of transmission to the local equipment. The actual delays incurred may vary considerably from packet to packet. In addition to the variations in packet delay incurred during the process described above, additional very significant delays may be incurred traversing the network architecture, specifically in the case of some wireless and satellite links but also over international links such as, e.g., but not limited to, through gateways between public IP data networks (not shown).

In an exemplary embodiment, device 100 (100a, 100b, 100c or collectively "100") can receive audio tones from PSTN lines and decode these tones as DTMF, FSK, PSK, QAM or other encoded signal types and which signal types are all considered analog audio tones or signals for the current description. Device 100 can also transmit audio tones to PSTN 206 lines and encode these tones as DTMF, FSK, PSK, QAM or other encoded signal types and which signal types are all considered analog audio tones or signals for the current description.

Referring to FIG. 3, in this embodiment both the alarm system 302 and alarm monitoring center 308 equipment may be connected or coupled to the described devices 100a and may exchange transmissions by operating as Modem Relay. In Modem Relay, analog tones may be received by device 100a, decoded, converted to a symbol stream and may be transmitted to the other device 100b over the network 310. At the receiving side 100b of network 310 the received symbols, and at device 100b may be buffered in an exemplary jitter buffer (not shown) within device 100b for a period of time to accommodate variations in delay over network 310, after which the symbols may be transmitted to the attached system 308 as PSTN audio tones using the appropriate modem protocol for the modem 208 of system 308.

In Modem Relay, decoded tone information may be transmitted between the devices 100a in the order they are received and with sufficient information that the tone sequences may be regenerated at the receiving side 100b of network 310 to duplicate the timing and modem format of the original PSTN signal received from the attached system 302. Any delay beyond that accommodated by the exemplary jitter buffer of 100a, 100b or any loss of symbol data at a receiving device 100b may lead to a break in the timely transmission of the modem signal to the attached system 200, which may in turn cause an interruption and eventual failure in the application. Such failure in the application may typically be caused by irrecoverable loss of critical application data and/or a procedural timeout during the call.

In accordance with an exemplary embodiment of the present invention conventional Modem Relay may be modified to prevent procedural timeouts in some applications. In the applications of interest, which may include some exemplary alarm systems, among other systems, the first communication may be initiated by an event at the alarm system 302 which may cause a PSTN call to be made to the alarm monitoring center 308. In the following description the TRANSMITTER shall therefore be considered the alarm system 302 and the RECEIVER shall be considered the monitoring center 308 although persons skilled in the art will recognize that "transmitter" and "receiver" are terms that could correctly be applied to multiple locations within the systems or alternatively both transmitter and receiver could be transceivers in an exemplary embodiment.

Referring again to FIGS. 2 and 3, in the exemplary system 200 (of FIG. 2) including the elements Alarm Panel 202, one or more connections 214, and one or more Dial Modems 204 of FIG. 2, (collectively referred to as the TRANSMITTER 302)in FIG. 3, may go off hook to initiate a PSTN call to the RECEIVER 308. Upon receipt of a dial tone from the PSTN 206 the TRANSMITTER may send a dial stream to the PSTN 206 to connect the two dial modems 206, 208. After the dial string has been output by the TRANSMITTER the TRANSMITTER may wait for a fixed time period T0 for the connection to be established. The signal to the TRANSMITTER that the connection has been established may be a handshake sequence of one or more tones from the RECEIVER, which may indicate to the TRANSMITTER that the RECEIVER is on line and the communication channel is open. If the TRANSMITTER does not receive the expected handshake response from the RECEIVER within the time period T0, the TRANSMITTER may hang up the call.

Referring to FIG. 3, in an exemplary embodiment 300 the TRANSMITTER 302 may go off hook to initiate a PSTN call to the RECEIVER 308, which event may be recognized by the first device 100a. In this embodiment, device 100a may return dial tone to the TRANSMITTER while also establishing a communication with the second device 100b. Upon communication between devices 100a, b the second device 100b may go off hook with the RECEIVER, which in this exemplary embodiment may be a PSTN connection or coupling. Upon the first device 100a returning dial tone to the TRANSMITTER, the TRANSMITTER may send a dial string to the device 100b which may be decoded by the device 100b. Each decoded digit may be transmitted to the second device 100b by the first device 100a, for example, immediately upon decoding, which may be before the tone has completed. The second device 100b may immediately dial each digit as it arrives such that the difference between connections may approximate to the delay over the network 310.

In the above exemplary embodiment a first PSTN connection may be established between the TRANSMITTER and the first device 100a and a second PSTN connection may be established between the RECEIVER and the second device 100b with a time difference that may vary based on factors which may include the delay over the network 310 and the exemplary attributes of the connection.

In an alternative exemplary embodiment 300 the TRANSMITTER 302 may go off hook to initiate a PSTN call to the RECEIVER, 308 which event may be recognized by the first device 100a. In this embodiment device 100 may return dial tone to the TRANSMITTER while also establishing a communication with the second device 100. In this embodiment the second device 100 may be directly connected to the RECEIVING modem device such that no dial string is necessary and in which case the second device 100 may delay establishing contact with the locally attached modem until all dialed digits have been received by the first device 100.

In an alternative exemplary embodiment 300 the TRANSMITTER may go off hook to initiate a PSTN call to the RECEIVER, which event is recognized by the first device 100. In this embodiment, extended delays over the network 310 may create the potential for a timeout due to T0. In an embodiment of the invention designed to minimize the likelihood of timeout T0 due to delay in responses to the TRANSMITTER, previously learned and/or stored information regarding the next event to take place may be utilized by the devices 100a,b. In this exemplary embodiment, upon recognition by the first device 100a that the line is off hook, the device 100 may delay returning dial tone to the TRANSMITTER for a pre-programmed or learned period T1 that may approximate to the delay over the network. Messages between the devices 100a,b may include the previously called PSTN number such that the RECEIVING device 100b may go off hook and start dialing the stored PSTN number in approximate synchronization with the TRANSMITTING device 100a returning dial tone and accepting incoming dial string from the TRANSMITTER. In the event that the dial stream received from the TRANSMITTING device and previously learned or stored information do not match the call may be terminated by the devices 100a,b.

In various exemplary embodiments, upon connection of the RECEIVER 308 to the second device 100b the RECEIVER 308 may transmit a sequence of one or more signals to confirm to the TRANSMITTER 302 that the communications channel is open. Upon first detection and decoding of this signal the second device 100b may immediately send a message to the first device 100a before the signal has completed to indicate that such a signal is being received so that the first device 100a may start to send the appropriate handshake signal to the TRANSMITTER before time T0 is expired. Messages may be transmitted between the devices 100a,b to indicate parameters of the signals to be transmitted and received such as, for example, but not limited to, start, stop, time or parameters of modulation. Defaults for such parameters may also be learned or preconfigured in the devices 100a,b.

In the exemplary system 200, in FIG. 2 and FIG. 3 upon receipt of handshake confirmation that the communications channel is open the TRANSMITTER 302 may start to send data according to the format of the data protocol being used. In the exemplary embodiment of system 200 the direct real time connection between modems 204, 208 ensures that there is no network delay between the TRANSMITTER 302 and the RECEIVER 308. Accordingly, after completing transmission of the opening handshake signal the RECEIVER 308 may expect a response from the TRANSMITTER 302 within a relatively short waiting period T2. If the RECEIVER 308 does not receive a response within the period T2 it may hang up the call.

In accordance with an exemplary embodiment of the present invention, to minimize the likelihood of time T2 being exceeded at the RECEIVER 308 it may be necessary for decoded tone information to be transmitted between devices 100a,b immediately when the decoded information is available, rather than waiting for the completion of a tone or tone sequence. Exemplary immediate transmission may be accomplished by using fast DSP techniques that can analyze incoming tone frequencies and other potential attributes within a very short period of time compared with the duration of the tone itself. In a more conventional store and forward arrangement, each tone or tone sequence may complete prior to forwarding, such that delays may accumulate and timers are more likely to expire. Expiration of timers may be of particular significance to the handshake responses, which typically may use longer symbol lengths than other data exchanges. Typical relay systems may await the duration of such signals to ensure that they meet the requirements of the underlying data protocol prior to forwarding the information. In embodiment of the present invention, early detection and forwarding of start information may minimize such delay.

Although tone information may be sent in advance of completion, it should be noted that the integrity of the communication is not generally compromised using the methods according to exemplary embodiment, because information is only transmitted after valid detection of a signal has been decoded. This is in contrast to alternative methods that may provide automatic local acknowledgement of communications and thereby take responsibility for delivery using for example, a store and forward system to deliver messages to the intended recipients.

In an exemplary embodiment, data sequences may also be forwarded in this manner. However, timing may be more tightly controlled, and received symbols may be stored in an exemplary jitter buffer by the receiving device 100b,c prior to retransmission to the RECEIVER 308 to prevent a break in mid transmission caused by jitter across the network. In accordance with embodiment the present invention the length of the exemplary jitter buffer may be set to a preprogrammed value or a learned value that may be determined from, for example, the performance of the network or other system parameters.

Referring back to FIG. 2 and FIG. 3, in an exemplary system 200, the TRANSMITTER 302 may send a data message to the RECEIVER 208 over the PSTN 206 network and expect an acknowledgement or so-called "Kissoff" message from the RECEIVER 308 within a time period T3. If such acknowledgement is not received within this time period the TRANSMITTER 302 may retransmit the message.

Referring to FIG. 3, in an exemplary embodiment of system 300, the TRANSMITTER 302 may send a data message to the RECEIVER 308 over the network and expect an acknowledgement or "Kissoff" message from the RECEIVER 308 within a time period T3. The above described methods of forwarding tone information between devices 100 as early as possible, including the kissoff message, may help avoid a timeout T3 from occurring. Nevertheless, the combination of extended network delays, and/or jitter compensation added to the time required for host computer turnaround, may still cause timeouts to occur in practical applications.

In the event that T3 timer expires and in accordance with the present invention, the first device 100a connected or coupled to the TRANSMITTER 302 may recognize that notification of a kissoff signal has not been received from the second device 100b and that the previous data sequence is being repeated. Under such circumstances the first device 100a may decode and hold the repeated data sequence and not transmit this to the second device 100b Additionally, should the first device 100a receive the kissoff notification while the TRANSMITTER 302 is resending the data message, the first device 100a may hold off sending the kissoff tone to the TRANSMITTER 308 until the second data transfer is completed. In the event that this occurs, the kissoff acknowledgment when received by the TRANSMITTER 302 may be accepted as acknowledgement of the second, repeated data sequence rather than acknowledgement of the first data sequence. In the event that kissoff does not arrive at the first device 100a prior to expiration of the second T3 timer, the device 100a may discard and not transmit the second data sequence to the second device 100b and may either wait for additional transmissions from the TRANSMITTER 302 or for the call to be ended by the TRANSMITTER 308.

It should be noted that the integrity of the kissoff process is not compromised using these methods, since kissoff is only transmitted to the TRANSMITTER 302 after valid decoding of an incoming kissoff signal by the second device 100b has been determined and been forwarded to the first device 100a. An advantage of this method is that it is fail-safe in the sense that the TRANSMITTER may not be erroneously notified that the data message has been accepted by the RECEIVER based on a local response from the first device 100a. This may be in contrast to other methods that may provide automatic local acknowledgement of communications and thereby taking responsibility for delivery of the message using for example, a store and forward system to deliver critical messages to the intended recipients.

Referring to FIG. 3, in an exemplary embodiment, diagram 300 illustrates that upon receipt of kissoff acknowledgement, the TRANSMITTER 302 may send a subsequent data message according to the format of the data protocol being used and repeat the data transfer and kissoff sequence multiple times. Provided the RECEIVER does not exceed any timer thresholds and end the call prematurely, the data transfer and kissoff sequence may occur multiple times, each of which may be handled by the devices 100a, 100b in the same manner as the first data message. Eventually the TRANSMITTER may end the call when the final kissoff message has been received, at which time the second device 100b will end the call with the RECEIVER.

Second Exemplary Embodiments for Connecting Analog Audio Tone Based Communications Systems Over a Packet Data Network Referring to FIG. 5, in an exemplary embodiment 500, device 100c provides the ability to receive VoIP packets directly, such as, for example, but not limited to from a VoIP service provider, and act as a VoIP gateway converting these packets to PSTN 206 compatible signals (not illustrated), or as illustrated, receive the regenerated audio signal directly from the PSTN 206 as an analog line or a TDM link. While exemplary attributes such as VoIP and compression may be described, the foregoing terminology is employed for illustrative purposes only and is in no way to be construed as limitations of the present embodiments.

Referring to FIG. 5, in an exemplary embodiment, operation of the TRANSMITTER 302 and RECEIVER 308 systems may be identical to the descriptions already given with reference to FIG. 3. In the exemplary embodiment of FIG. 5, an audio signal received by the device 100c across the network 500 (including 506, 508, 206, and 510) may have been compressed and decompressed by, for example, a VoIP or cellular telephone system. Referring to FIG. 5, a direct connection or coupling of the PSTN 206 link 510 to the dial modem link 512 may cause modem communications to fail due to the inability of the modems 208 to correctly decode the incoming audio signals, such failure to decode the incoming signals being due to the reduced quality in the audio caused by, for example, but not limited to, lost or delayed packets, and/or loss of signal, or signal fidelity from the VoIP compression and decompression processes.

In an exemplary embodiment of FIG. 5, device 100c may combine functions of the two devices 100a, b, described in previous text. An addition, devices 100c may decode the incoming tones from the PSTN 206 using exemplary advanced digital signal processing (DSP) techniques that may overcome the distortion created by the VoIP systems, and may regenerate clean tones that the modem at the RECEIVER 308 can decode.

Referring to FIG. 5, in an exemplary embodiment data tone sequences in the direction from the TRANSMITTER 302 to the RECEIVER 308 may be more complex and may be shorter in duration than the handshake and kissoff tones sent in the reverse direction. As a result, these longer response tones from RECEIVER 308 to TRANSMITTER 302 may be more successfully decoded without using a second device 100 at the TRANSMITTER 302, in an exemplary embodiment. However if the received signal quality and other operational characteristics of the system cause the modem at the TRANSMITTER 302 to fail to decode signals correctly, a second device 100d (not shown) may be located in link 502 to provide clean signal regeneration and/or other previously described functions at both the RECEIVER 308 and TRANSMITTER 302 sides of the network 500.

An Exemplary Computer System

Figure 4:
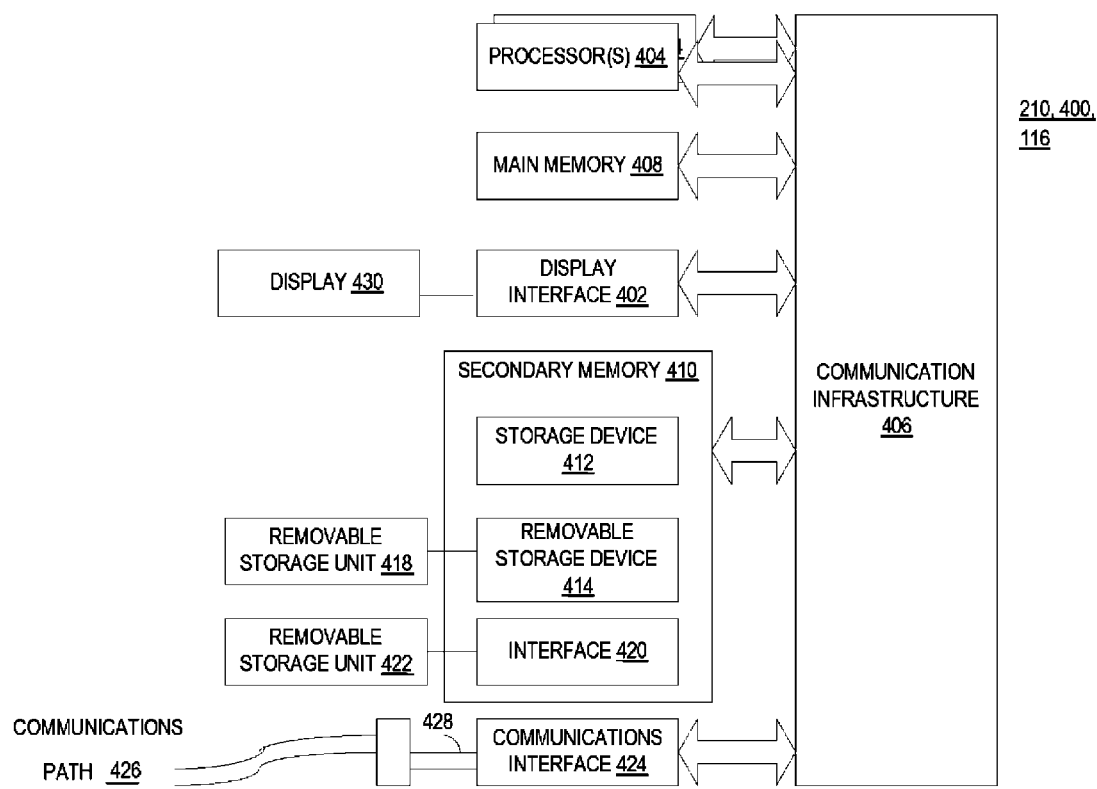
FIG. 4 illustrates an exemplary embodiment of a computer system that may be used to practice the system and/or methods in accordance with the various exemplary embodiments.

FIG. 4 depicts an exemplary embodiment of a computer system 400 that may be used in association with, in connection with, and/or in place of, but not limited to, computer platform 114, according to exemplary embodiments of the present invention.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 400 is shown in FIG. 4, depicting an exemplary embodiment of a block diagram of an exemplary computer system useful for implementing the present invention. Specifically, FIG. 4 illustrates an example computer 400, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., MAC/OS, MAC/OSX, IO5, etc. from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein.

An exemplary computer system, computer 400 is shown in FIG. 4. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 4.

The computer system 400 may include one or more processors, such as, e.g., but not limited to, processor(s) 404. The processor(s) 404 may be connected to a communication infrastructure 406 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 430.

The computer system 400 may also include, e.g., but may not be limited to, a main memory 408, random access memory (RAM), and/or a secondary memory 410, etc. The secondary memory 410 may include, for example, (but not limited to) a hard disk drive 412, flash memory, a storage device, and/or a removable storage drive 414, representing a floppy diskette drive, a magnetic tape drive, an optical disk drive, a compact disk drive CD-ROM, etc. The removable storage drive 414 may, e.g., but not limited to, read from and/or write to a removable storage unit 418 in a well known manner. Removable storage unit 418, also called a program storage device or a computer program product, may represent, e.g., but not limited to, a floppy disk, magnetic tape, optical disk, compact disk, etc. which may be read from and written to by removable storage drive 414. As will be appreciated, the removable storage unit 418 may include a computer usable storage medium having stored therein computer software and/or data.

In alternative exemplary embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device such as, e.g., (but not limited to) a mouse or other pointing device such as a digitizer, and a keyboard or other data entry device (none of which are labeled).

Computer 400 may also include output devices, such as, e.g., (but not limited to) display 430, and display interface 402. Computer 400 may include input/output (I/O) devices such as, e.g., (but not limited to) communications interface 424, cable 428 and communications path 426, etc. These devices may include, e.g., but not limited to, a network interface card, and modems (neither are labeled). Communications interface 424 may allow software and data to be transferred between computer system 400 and external devices. Examples of communications interface 424 may include, e.g., but may not be limited to, a modem, a network interface (such as, e.g., an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via, e.g., but not limited to, a communications path 426 (e.g., but not limited to, a channel). This channel 426 may carry signals 428, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 414, a hard disk installed in hard disk drive 412, and signals 428, etc. These computer program products may provide software to computer system 400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to provide a method to resolve conflicts during data synchronization according to an exemplary embodiment of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using, e.g., but not limited to, removable storage drive 414, hard drive 412 or communications interface 424, etc. The control logic (software), when executed by the processor 404, may cause the processor 404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

Conclusion

Although the invention is described in terms of these example environments, it is important to note that description in these terms is provided for purposes of illustration only. It is not intended that the invention be limited to these example environments or to the precise inter-operations between the above-noted entities and devices. In fact, after reading the following description, it will become apparent to a person skilled in the relevant art how to implement the invention in alternative environments.

What is claimed is:

1. A system for transmitting and receiving public switched telephone network (PSTN) compatible audio signals over a packet data network comprising:

a first system, coupled to the packet data network, operative to:
receive an incoming PSTN-compatible audio frequency signal;
decode and interpret said incoming PSTN-compatible audio frequency signal according to a message format and a modem protocol being used to obtain signal information;
process said signal information according to at least one preprogrammed rule to generate an outgoing digital message,
wherein said process according to said at least one preprogrammed rule to generate said outgoing digital message further to:
recognize an expected behavior of said underlying modem protocol, and
adjust behavior to suit said expected behavior comprising at least one of:
delay delivery of a response comprising said outgoing digital message,
hold delivery indefinitely of a response comprising said outgoing digital message, or
generate said outgoing digital message according to said at least one preprogrammed rule;
transmit said outgoing digital message to a second system, the second system also coupled to the packet data network, over the packet data network according to said at least one preprogrammed rule, unless said outgoing digital message is to be held indefinitely;
receive and interpret an incoming digital message from the second system;
process said incoming digital message according to at least one preprogrammed rule
wherein said process said incoming digital message according to said at least one preprogrammed rule to generate an outgoing analog audio frequency signal further to:
recognize said expected behavior of said underlying modem protocol, and
adjust behavior to suit said expected behavior comprising at least one of:
deliver a response comprising said outgoing analog audio frequency signal,
hold delivery indefinitely of a response comprising said outgoing analog audio frequency signal, or
generate said outgoing analog audio frequency signal with an alternative analog audio frequency signal generated according to at least one preprogrammed rule; and
encode and regenerate said outgoing analog audio frequency signals, unless said outgoing analog audio frequency signal is to be held indefinitely.

2. The system of claim 1, wherein the packet data network comprises an Internet protocol (IP) based network.

3. The system of claim 1, wherein the packet network comprises a satellite based network.

4. The system of claim 1, wherein the packet network comprises a wireless based network.

5. The system of claim 1, wherein the packet network comprises at least one of a cable, a fiber or an other type of terrestrial based network.

6. The system of claim 1, further comprising:
the second system coupled to said first system operative to
receive a second incoming PSTN-compatible audio frequency signal;
decode and interpret said second incoming PSTN-compatible audio frequency signal according to said message format and said modem protocol being used to obtain second signal information;
process said second signal information according to at least one preprogrammed rule to generate a second outgoing digital message;
transmit said second outgoing digital message to the first system over the packet data network;
receive and interpret a second incoming digital message from the first system; and
encode and regenerate a second outgoing audio frequency signal.

7. The system of claim 1, wherein said first system and said second system are located at least one of: at a single location, or at different locations.

8. The system of claim 1, wherein the system provides an ability to interface directly or indirectly through a PSTN gateway to a VoIP packet system.

9. The system of claim 1, further comprising at least one of: compression, or decompression, of at least one of: PSTN, or VoIP, compatible audio signals.

10. The system of claim 1, wherein the system uses at least one of predetermined information, learned information, or preconfigured information, to determine said preprogrammed rules to apply to forwarding of messages between said first and second systems.

11. The system of claim 1, further comprising a control channel comprising at least one of: an in-band control channel, or an out-of-band control channel, said control channel operable to remotely manage said first and second systems, and wherein said control channel is operable to provide communications to perform at least one of: provide monitoring function; provide a control function;
determine real time diagnostic information; determine status information; or determine ancillary information.

12. The system claim 1, wherein said first system is operative to process at least one of: forward said signal information, delay said signal information, or discard said signal information.

13. A method for transmitting and receiving public switched telephone network (PSTN) compatible audio signals over a packet data network comprising:
receiving a first incoming PSTN-compatible audio frequency signal;
decoding and interpreting said first incoming PSTN-compatible audio frequency signal according to a message format and a modem protocol being used obtaining first signal information;
processing said first signal information according to at least one preprogrammed rule generating a first outgoing digital message
wherein said processing said first signal information according to said at least one preprogrammed rule generating said first outgoing digital message comprises:
recognizing an expected behavior of said underlying modem protocol, and
adjusting behavior to suit said expected behavior comprising:
delaying delivery of a response comprising said first outgoing digital message,
holding delivery indefinitely of a response comprising said first outgoing digital message, or
generating said first outgoing digital message according to said at least one preprogrammed rule;

transmitting said first outgoing digital message from a first system to a second system over a packet data network according to said at least one preprogrammed rule, unless said first outgoing digital message is to be held indefinitely;
receiving and interpreting a first incoming digital message from the second system;
processing said first incoming digital message according to at least one preprogrammed rule
wherein said process said first incoming digital message according to said at least one preprogrammed rule comprises:
generating an outgoing analog audio frequency signal comprising:
recognizing said expected behavior of said underlying modem protocol, and
adjusting behavior to suit said expected behavior comprising at least one of:
delivering a response comprising said outgoing analog audio frequency signal,
holding delivery indefinitely of a response comprising said outgoing analog audio frequency signal, or
generating said outgoing analog audio frequency signal with an alternative analog audio frequency signal generated according to at least one preprogrammed rule; and
encoding and regenerating said outgoing analog audio frequency signal, unless said outgoing analog audio frequency signal is to be held indefinitely.

14. The method of claim 13, wherein the packet data network comprises an Internet protocol (IP) based network.

15. The method of claim 13, wherein the packet network comprises a satellite based network.

16. The method of claim 13, wherein the packet network comprises a wireless based network.

17. The method of claim 13, wherein the packet network comprises at least one of: a cable, a fiber, or an other type of terrestrial based network.

18. The method of claim 13, further comprising:
receiving a second incoming PSTN-compatible audio frequency signal;
decoding and interpreting said second incoming PSTN-compatible audio frequency signal according to said message format and said modem protocol being used obtaining second signal information;
processing said second signal information according to at least one preprogrammed rule generating a second outgoing digital message;
transmitting said second outgoing digital message from the second system to the first system over the packet data network;
receiving and interpreting a second incoming digital message from the first system; and
encoding and regenerating a second outgoing audio frequency signal.

19. The method of claim 13, wherein said first system and said second system are at least one of: at a single location, or at different locations.

20. The method of claim 13, further comprising providing the ability to interface to a VoIP packet system.

21. The method of claim 13, further comprising: compressing and decompressing at least one of: PSTN-compatible, or VoIP-compatible, audio signals.

22. The method of claim 13, further comprising: using at least one of:
predetermined information, learned information, or preconfigured information, in determining said preprogrammed rules to apply to the forwarding of messages between said first and second systems.

23. The method of claim 13, further comprising using a control channel comprising at least one of: using an in-band control channel, or using an out-of-band control channel, said using said control channel comprising remotely managing said first and second systems, and
wherein said using said control channel comprises providing communications performing at least one of: providing a monitoring function; providing a control function; determining real time diagnostic information; determining real time diagnostic information; determining status information; or determining ancillary information.

24. A nontransitory machine-readable medium that provides instructions, which when executed by a computing platform, causes said computing platform to perform operations comprising a method for transmitting and receiving PSTN compatible audio signals over a packet data network, the method comprising:
receiving a first incoming PSTN-compatible audio frequency signal;
decoding and interpreting said first incoming PSTN-compatible audio frequency signal according to a message format and a modem protocol being used obtaining first signal information;
processing said first signal information according to at least one preprogrammed rule generating a first outgoing digital message
wherein said processing said first signal information according to said at least one preprogrammed rule generating said first outgoing digital message comprises:
recognizing an expected behavior of said underlying modem protocol, and
adjusting behavior to suit said expected behavior comprising:
delaying delivery of a response comprising said outgoing digital message,
holding delivery indefinitely of a response comprising said outgoing digital message, or
generating said outgoing digital message according to said at least one preprogrammed rule;
transmitting said first ongoing digital message from a first system to a second system over the packet data network according to said at least one preprogrammed rule, unless said outgoing digital message is to be held indefinitely;
receiving and interpreting a first incoming digital message from the second system;
processing said first incoming digital message according to at least one preprogrammed rule
wherein said process said first incoming digital message according to said at least one preprogrammed rule comprises:
generating an outgoing analog audio frequency signal comprising:
recognizing an expected behavior of said underlying modem protocol, and
adjusting behavior to suit said expected behavior comprising at least one of:
delivering a response comprising said outgoing analog audio frequency signal, holding delivery indefinitely of a response comprising said outgoing analog audio frequency signal, or
generating said outgoing analog audio frequency signal with an alternative analog audio frequency signal generated according to at least one preprogrammed rule; and
encoding and regenerating said outgoing analog audio frequency signal, unless said outgoing analog audio frequency signal is to be held indefinitely.

25. The nontransitory machine-readable medium of claim 24, wherein the method comprises: performing functions of said first system and said second system at least one of: at a single location, or at different locations.

26. A system for transmitting and receiving public switched telephone network (PSTN) compatible audio signals over a packet data network comprising:
a first system, coupled to the packet data network, operative to:
receive incoming packet-based PSTN audio frequency signal information from at least one data packet directly from the packet data network or indirectly through a PSTN gateway;
decode and interpret said incoming packet-based PSTN audio frequency signal information according to a message format and a modem protocol being used; and
process, encode and regenerate an outgoing analog audio frequency signal according to at least one preprogrammed rule,
wherein said process, according to said at least one preprogrammed rule, is to generate said outgoing analog audio frequency signal further to:
recognize said expected behavior of said underlying modem protocol, and
adjust behavior to suit said expected behavior comprising at least one of:
deliver a response comprising said outgoing analog audio frequency signal,
delay delivery of a response comprising said outgoing analog audio frequency signal,
hold delivery indefinitely of a response comprising said outgoing analog audio frequency signal, or
generate said outgoing analog audio frequency signal according to said at least one preprogrammed rule.

27. The system of claim 26, further comprising:
a second system, coupled to said first system, said second system operative to
receive at least one incoming PSTN-compatible audio frequency signal;
decode and interpret said at least one incoming PSTN-compatible audio frequency signal according to said message format and said modem protocol being used to obtain second signal information;
process said second signal information according to at least one preprogrammed rule;
generate at least one data packet containing outgoing PSTN audio frequency signal information; and
transmit said at least one data packet containing said outgoing PSTN audio frequency signal information over the packet data network.

28. The system according to claim 27, wherein said first and said second systems are operable to at least one of:
share data;
communicate;
be part of the same or a different system; or
run a different set of rules.

29. A method for transmitting and receiving public switched telephone network (PSTN) compatible audio signals over a packet data network comprising:
receiving incoming packet-based PSTN audio frequency signal information from at least one data packet at least one of: directly from the packet data network or indirectly through a PSTN gateway;
decoding and interpreting said incoming packet-based PSTN audio frequency signal information according to a message format and a modem protocol being used; and
processing,
encoding and regenerating an outgoing analog PSTN-compatible audio frequency signal according to at least one preprogrammed rule
wherein said processing, according to said at least one preprogrammed rule, comprises generating said outgoing analog PSTN-compatible audio frequency signal comprising:
recognizing said expected behavior of said underlying modem protocol, and
adjusting behavior to suit said expected behavior comprising:
delivering a response comprising said outgoing PSTN-compatible analog audio frequency signal,
delaying delivery of a response comprising said outgoing PSTN-compatible analog audio frequency signal,
holding delivery indefinitely of a response comprising said outgoing PSTN-compatible analog audio frequency signal, or
generating said outgoing PSTN-compatible analog audio frequency signal according to said at least one preprogrammed rule.

30. The method of claim 29, further comprising:
receiving at least one incoming PSTN-compatible audio frequency signal;
decoding and interpreting said at least one incoming PSTN-compatible audio frequency signal according to said message format and said modem protocol being used to obtain second signal information;
processing said second signal information according to at least one preprogrammed rule;
generating at least one data packet containing outgoing PSTN audio frequency signal information; and
transmitting said at least one data packet containing said outgoing PSTN audio frequency signal information over the packet data network.

31. The method according to claim 30, further comprising at least one of:
sharing data between a first system and a second system coupled to the packet data network;
communicating between said first system and said second system;
said first system, and said second system being part of the same or a different system; or
wherein said processing comprises running a different set of rules.

32. A nontransitory machine-readable medium that provides instructions, which when executed by a computing platform, causes said computing platform to perform operations comprising a method for transmitting and receiving public switched telephone network (PSTN) compatible audio signals over a packet data network, the method comprising:

receiving incoming packet-based PSTN audio frequency signal information from at least one data packet directly from the data packet data network or indirectly through a PSTN gateway;

decoding and interpreting said incoming packet-based PSTN audio frequency signal information according to a message format and a modem protocol being used; and processing, encoding and regenerating an outgoing analog PSTN-compatible audio frequency signal according to at least one preprogrammed rule wherein said processing, according to said at least one preprogrammed rule, comprises generating said outgoing analog audio frequency signal comprising:

recognizing an expected behavior of said underlying modem protocol, and adjusting behavior to suit said expected behavior comprising:

delivering a response comprising said outgoing analog audio frequency signal, delaying delivery of a response comprising said outgoing analog audio frequency signal, holding delivery indefinitely of a response comprising said outgoing analog audio frequency signal, or generating said outgoing analog audio frequency signal according to said at least one preprogrammed rule.

33. The nontransitory machine-readable medium of claim 32, wherein the method further comprises:

receiving at least one incoming PSTN-compatible audio frequency signal;

decoding and interpreting said at least one incoming PSTN-compatible audio frequency signal according to said message format and said modem protocol being used to obtain second signal information;

processing said second signal information according to at least one preprogrammed rule;

generating at least one data packet containing outgoing PSTN audio frequency signal information; and transmitting said at least one data packet containing said outgoing PSTN audio frequency signal information over the packet data network.

\* \* \* \* \*